(12) United States Patent
Muto et al.

(10) Patent No.: US 12,427,832 B2
(45) Date of Patent: Sep. 30, 2025

(54) AIR CONDITIONER

(71) Applicant: DENSO CORPORATION, Kariya (JP)

(72) Inventors: Naito Muto, Kariya (JP); Yoshiki Katoh, Kariya (JP); Hiroaki Kawano, Kariya (JP); Yukihisa Ijuin, Kariya (JP); Yoshinori Ichishi, Kariya (JP); Yoshio Hayashi, Kariya (JP); Junki Hirayama, Kariya (JP); Yasuhiro Yokoo, Kariya (JP)

(73) Assignee: DENSO CORPORATION, Kariya (JP)

( * ) Notice: Subject to any disclaimer, the term of this patent is extended or adjusted under 35 U.S.C. 154(b) by 216 days.

(21) Appl. No.: 18/466,481

(22) Filed: Sep. 13, 2023

(65) Prior Publication Data

US 2024/0010045 A1    Jan. 11, 2024

Related U.S. Application Data

(63) Continuation of application No. PCT/JP2022/010180, filed on Mar. 9, 2022.

(30) Foreign Application Priority Data

Mar. 18, 2021    (JP) .................................. 2021-044593

(51) Int. Cl.
*B60H 1/00*    (2006.01)
*B60H 1/12*    (2006.01)

(52) U.S. Cl.
CPC ..... *B60H 1/00885* (2013.01); *B60H 1/00064* (2013.01); *B60H 1/12* (2013.01); *B60H 2001/00092* (2013.01); *B60H 2001/00928* (2013.01)

(58) Field of Classification Search
CPC .. B60H 1/00885; B60H 1/00064; B60H 1/12; B60H 2001/00092; B60H 2001/00928
USPC ......................................................... 165/202
See application file for complete search history.

(56) References Cited

U.S. PATENT DOCUMENTS

| | | |
|---|---|---|
| 2009/0193830 A1 | 8/2009 | Yoshioka |
| 2021/0252941 A1 | 8/2021 | Higuchi et al. |
| 2021/0291626 A1 | 9/2021 | Makimoto et al. |

FOREIGN PATENT DOCUMENTS

| | | | |
|---|---|---|---|
| CN | 104093587 B | * | 7/2017 |
| JP | 2003237357 A | | 8/2003 |
| JP | 2009184493 A | | 8/2009 |
| JP | 2012197012 A | | 10/2012 |

(Continued)

*Primary Examiner* — Davis D Hwu
(74) *Attorney, Agent, or Firm* — Harness, Dickey & Pierce, P.L.C.

(57) ABSTRACT

In an air conditioner, a heat medium circuit includes: a first branch part, a first merging part, a second branch part, and a second merging part. A first flow rate adjusting unit is disposed in the heat medium circuit between the first branch part and an outside-air heat exchanger or between the outside-air heat exchanger and the first merging part, and a second flow rate adjusting unit is disposed in the heat medium circuit between the first branch part and the first heater core or between the first heater core and the first merging part. At least one of the first flow rate adjusting unit or the second flow rate adjusting unit is configured to optionally adjust the flow rate of the heat medium, and a controller controls the at least one of the first flow rate adjusting unit or the second flow rate adjusting unit.

14 Claims, 6 Drawing Sheets

(56) References Cited

FOREIGN PATENT DOCUMENTS

| JP | 2020075623 A | 5/2020 |
|---|---|---|
| JP | 2020104841 A | 7/2020 |

\* cited by examiner

AIR CONDITIONER

CROSS REFERENCE TO RELATED APPLICATION

The present application is a continuation application of International Patent Application No. PCT/JP2022/010180 filed on Mar. 9, 2022, which designated the U.S. and claims the benefit of priority from Japanese Patent Application No. 2021-044593 filed on Mar. 18, 2021. The entire disclosures of all of the above applications are incorporated herein by reference.

TECHNICAL FIELD

The present disclosure relates to an air conditioner including a plurality of heater cores and radiators.

BACKGROUND

Conventionally, a vehicle air conditioner including a condenser, a heater core, and a radiator has been described. The condenser causes a heat exchange between a high-pressure refrigerant of a refrigeration cycle and a cooling water to heat the cooling water. The heater core causes heat exchange between the cooling water heated by the condenser and air blown into a vehicle interior to heat the air blown into the vehicle interior. The radiator causes heat exchange between the cooling water and outside air to radiate heat from the cooling water to the outside air.

SUMMARY

According to an aspect of the present disclosure, an air conditioner including a plurality of heater cores, a heat-radiation heat exchanger and an outside-air heat exchanger is configured to appropriately adjust a flow rate of a heat medium with respect to the plurality of heater cores, the heat-radiation heat exchanger and the outside-air heat exchanger.

BRIEF DESCRIPTION OF DRAWINGS

The above object and other objects, features, and advantages of the present disclosure will become more apparent from the following detailed description with reference to the accompanying drawings. In which.

DESCRIPTION OF EMBODIMENTS

Figure 1:
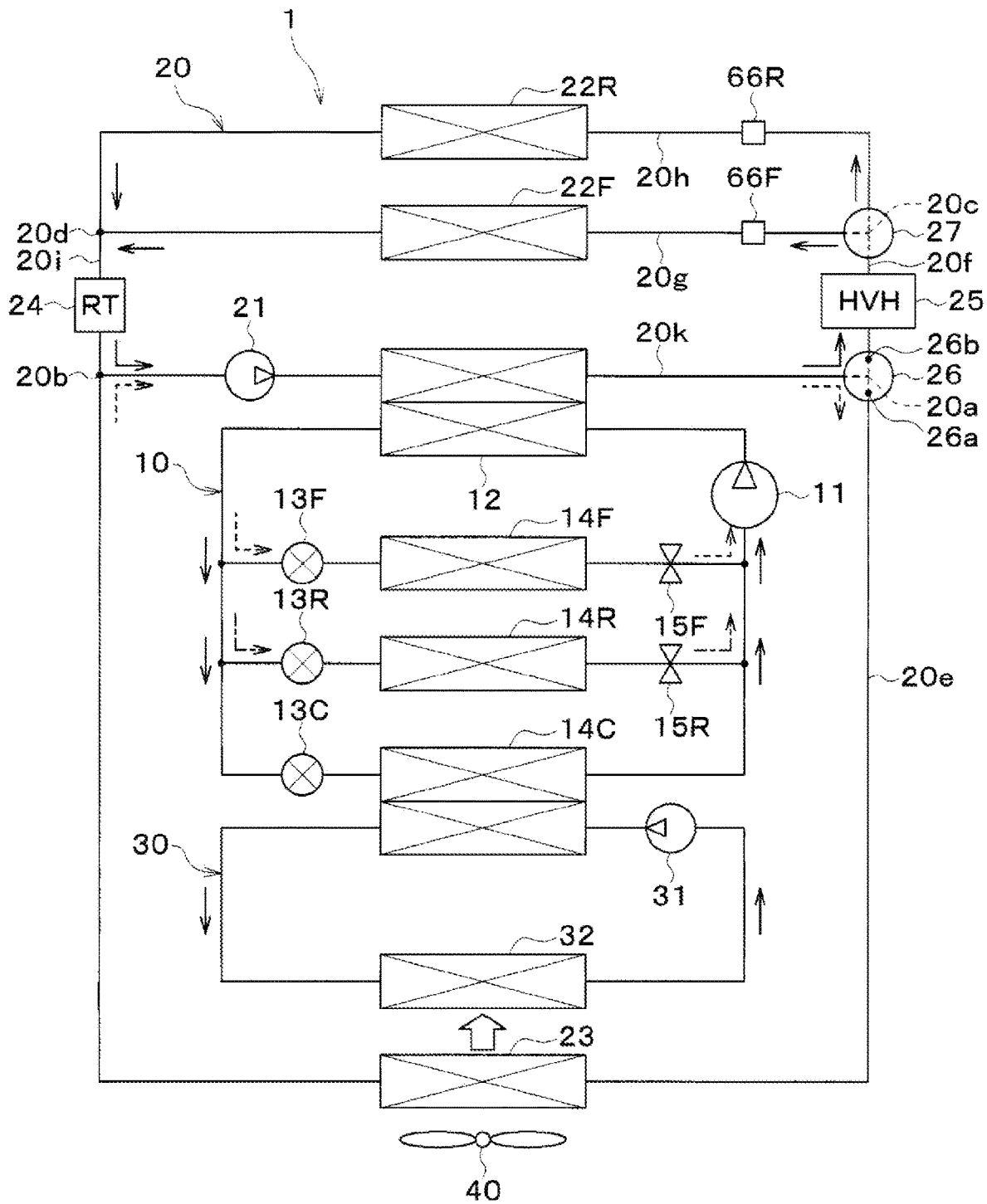
FIG. 1 is an overall configuration diagram illustrating an air conditioner of a first embodiment.

In an air conditioner, when a front-seat side heater core and a rear-seat side heater core are provided as heater cores to improve a performance of vehicle interior air conditioning, it is necessary to individually and appropriately adjust a flow rate of cooling water flowing into the front-seat side heater core, the rear-seat side heater core, an outside-air heat exchanger and the like.

In view of the above points, an object of the present disclosure is to provide an air conditioner that can appropriately adjust a flow rate of a heat medium with respect to a plurality of heater cores, the outside-air heat exchanger and the like.

According to an aspect of the present disclosure, an air conditioner includes: a compressor configured to suck, compress, and discharge a refrigerant; a heat-radiation heat exchanger configured to radiate heat to a heat medium from the refrigerant that is discharged from the compressor; a decompression unit configured to decompress the refrigerant having radiated heat at the heat-radiation heat exchanger; an evaporator configured to cause the refrigerant decompressed at the decompression unit to absorb heat and to be evaporated; a heat medium circuit in which the heat medium having radiated heat at the heat radiation heat exchanger circulates; a first heater core and a second heater core that are disposed in the heat medium circuit to perform heat exchange between the heat medium and air blown into a space to be air conditioned; an outside-air heat exchanger that is disposed in the heat medium circuit to perform heat exchange between outside air and the heat medium; a controller configured to control the heat medium circuit. The heat medium circuit includes: a first branch part where a flow of the heat medium branches into a first stream flowing toward the first heater core and a second stream flowing toward the outside-air heat exchanger; a first merging part where the heat medium from the first heater core merges with the heat medium flowing from the outside-air heat exchanger; a second branch part where the heat medium of the first stream between the first branch part and the first heater core branches to flow into the second heater core; and a second merging part where the heat medium flowing from the second heater core merges with the heat medium from the first heater core at a portion between the first heater core and the first merging part.

A first flow rate adjusting unit is disposed in the heat medium circuit between the first branch part and the outside-air heat exchanger or between the outside-air heat exchanger and the first merging part, to adjust a flow rate of the heat medium. A second flow rate adjusting unit is disposed in the heat medium circuit between the first branch part and the first heater core or between the first heater core and the first merging part, to adjust a flow rate of the heat medium. In addition, at least one of the first flow rate adjusting unit or the second flow rate adjusting unit is configured to optionally adjust the flow rate of the heat medium, and the controller is configured to control the at least one of the first flow rate adjusting unit or the second flow rate adjusting unit.

For example, the at least one of the first flow rate adjusting unit or the second flow rate adjusting unit may be made of a three-way valve that is disposed at the first branch part or the first merging part. A first temperature detector may be configured to detect a temperature of the heat medium flowing into the first heater core, and a second temperature detector may be configured to detect the temperature of the heat medium flowing into the second heater core.

As an example, the controller may be configured to control the at least one of the first flow rate adjusting unit or the second flow rate adjusting unit, and to decrease a flow rate ratio of the heat medium flowing toward the outside-air heat exchanger when a target temperature of at least one of the first heater core or the second heater core increases.

A first air mix door may be configured to adjust an air temperature blown into the space to be air conditioned by adjusting an air volume ratio between an air flow flowing through the first heater core and an air flow bypassing the first heater core, and a second air mix door may be configured to adjust the air temperature blown into the space to be air conditioned by adjusting an air volume ratio between an air flow flowing through the second heater core and an air flow bypassing the second heater core. In this case, the controller is configured to:

control the at least one of the first flow rate adjusting unit or the second flow rate adjusting unit, to cause a temperature of one of the first heater core or the second heater core, having a higher value of a target temperature, to become the target temperature; and control the first air mix door and the second air mix door, to cause the air temperature flowing out of the first heater core or the second heater core, having a lower value of the target temperature, to become a target air temperature.

In the air conditioner, a first air mix door may be configured to adjust an air volume ratio between air flowing through the first heater core and air bypassing the first heater core, and a second air mix door may be configured to adjust an air volume ratio between air flowing through the second heater core and air bypassing the second heater core. In this case, the controller is configured to: control the at least one of the first flow rate adjusting unit or the second flow rate adjusting unit, to cause a temperature of one of the first heater core or the second heater core, having a larger value of a sum of a target temperature and an amount of decrease in a heat medium temperature due to heat loss in the heat medium circuit, to become the target temperature, and control the first air mix door and the second air mix door to cause an air temperature flowing out of the other one of the first heater core or the second heater core, having a smaller value of the sum, to become a target air temperature.

Alternatively, the controller may be configured to:

control the at least one of the first flow rate adjusting unit or the second flow rate adjusting unit, to cause a temperature of one of the first heater core or the second heater core, having a larger value of a difference between a target temperature and a current heat medium temperature, to become the target temperature, and control the first air mix door and the second air mix door, to cause an air temperature flowing out of one of the first heater core or the second heater core, having a smaller value of the difference between the target temperature and the current heat medium temperature, to become the target temperature.

In a case where only one of the first heater core or the second heater core performs a heat exchange, the controller may be configured to control the at least one of the first flow rate adjusting unit or the second flow rate adjusting unit, to decrease the flow rate ratio of the heat medium flowing toward the radiator when a target temperature of the one of the first heater core or the second heater core increases. in a case where both of the first heater core and the second heater core perform heat exchange, the controller is configured (i) to control the at least one of the first flow rate adjusting unit or the second flow rate adjusting unit, to cause a temperature of one of the first heater core or the second heater core, having a higher value of a target temperature, to become the target temperature, and (ii) to control the first air mix door and the second air mix door to cause an air temperature flowing out of one of the first heater core or second heater core, having a lower value of the target temperature, to become a target air temperature. In addition, the controller may be configured to control the compressor to cause the temperature of the one of the first heater core or the second heater core, having the higher value of the target temperature, to become the target temperature, in a case where a heat exchange amount is insufficient in the one of the first heater core or the second heater core, having the higher value of the target temperature, even when the at least one of the first flow rate adjusting unit or the second flow rate adjusting unit is controlled.

The controller may be configured to control the at least one of the first flow rate adjusting unit or the second flow rate adjusting unit, (i) to have a magnitude relationship among heat medium flow rates in this order of the first heater core>the second heater core>the outside air heat exchanger; and (ii) to cause a sum of a product of the heat medium flow rate and a heat exchange area in the first heater core and a product of the heat medium flow rate and the heat exchange area in the second heater core to become equal to a product of the heat medium flow rate and the heat exchange area in the outside-air heat exchanger.

Hereinafter, multiple embodiments for performing the present disclosure will be described with reference to the drawings. In each embodiment, portions corresponding to those described in the preceding embodiment are denoted by the same reference numerals, and overlapping descriptions may be omitted. In a case where only a part of a configuration is described in each embodiment, the other embodiments described above are capable of being applied for the other parts of the configuration. Not only a combination of parts that clearly indicate that the combination is possible in each embodiment, but also a partial combination of embodiments even if the combination is not specified is also possible when there is no problem in the combination.

First Embodiment

Figure 2:
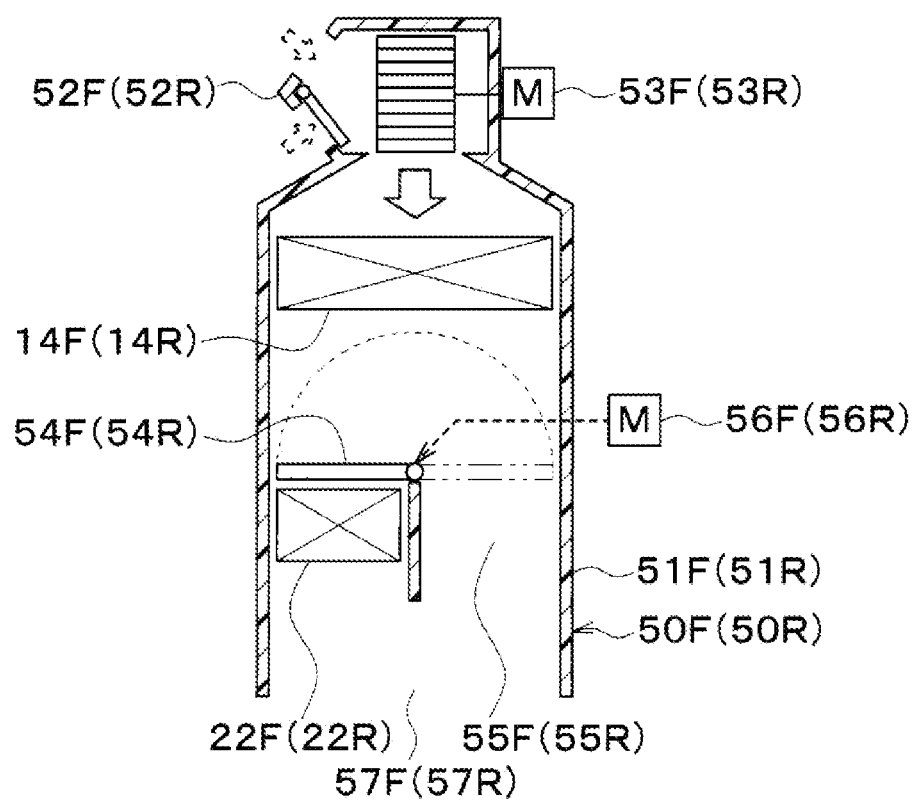
FIG. 2 is a configuration diagram illustrating a front-seat side air conditioning unit in the air conditioner of the first embodiment.
Figure 3:
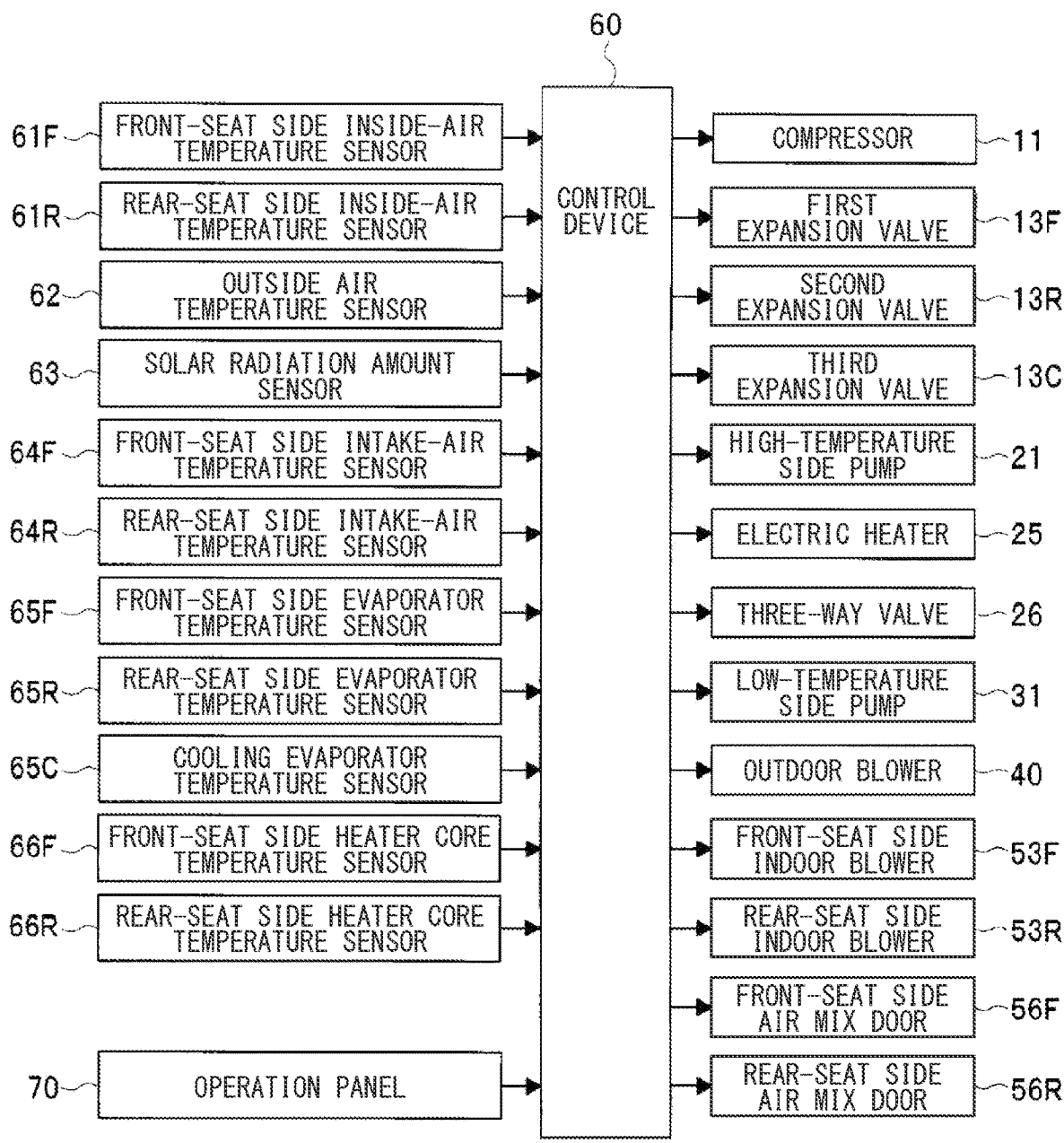
FIG. 3 is a configuration diagram illustrating an electric control unit in the air conditioner of the first embodiment.

Hereinafter, a first embodiment is described. A vehicle air conditioner 1 illustrated in FIGS. 1 to 3 is an air conditioner that adjusts a vehicle interior space (in other words, a space to be air conditioned) to an appropriate temperature. The vehicle air conditioner 1 includes a refrigeration cycle device 10.

As illustrated in FIG. 1, the refrigeration cycle device 10 is a vapor compression refrigerator including a compressor 11, a condenser 12 (i.e., heat-radiation heat exchanger), a first expansion valve 13F, a front-seat side evaporator 14F, a front-seat side constant pressure valve 15F, a second expansion valve 13R, a rear-seat side evaporator 14R, a rear-seat side constant pressure valve 15R, a third expansion valve 13C, and a cooling evaporator 14C. In the refrigeration cycle device 10 according to the present embodiment, a fluorocarbon refrigerant is used as the refrigerant to constitute a subcritical refrigeration cycle in which a high-pressure side refrigerant pressure does not exceed a critical pressure of the refrigerant.

The second expansion valve 13R and the rear-seat side evaporator 14R are disposed in parallel to the first expansion valve 13F and the front-seat side evaporator 14F in the refrigerant flow. The third expansion valve 13C and the cooling evaporator 14C are disposed in parallel to the first expansion valve 13F and the front-seat side evaporator 14F in the refrigerant flow. The third expansion valve 13C and the cooling evaporator 14C are disposed in parallel also to the second expansion valve 13R and the rear-seat side evaporator 14R in the refrigerant flow.

The refrigeration cycle device 10 includes a first refrigerant circulation circuit, a second refrigerant circulation circuit, and a third refrigerant circulation circuit. In the first refrigerant circulation circuit, the refrigerant circulates through the compressor 11, the condenser 12, the first expansion valve 13F, the front-seat side evaporator 14F, the front-seat side constant pressure valve 15F, and the compressor 11 in this order. In the second refrigerant circulation circuit, the refrigerant circulates through the compressor 11, the condenser 12, the second expansion valve 13R, the rear-seat side evaporator 14R, the rear-seat side constant pressure valve 15R, and the compressor 11 in this order. In the third refrigerant circulation circuit, the refrigerant circulates through the compressor 11, the condenser 12, the third expansion valve 13C, the cooling evaporator 14C, and the compressor 11 in this order.

The compressor 11 is an electric compressor driven by electric power supplied from a battery, and sucks, compresses, and discharges the refrigerant of the refrigeration cycle device 10. An electric motor of the compressor 11 is controlled by a control device 60. The compressor 11 may be a variable displacement compressor driven by a belt.

The condenser 12 is a high-pressure side heat exchanger that causes heat exchange between the high-pressure side refrigerant discharged from the compressor 11 and the cooling water in a high-temperature cooling water circuit 20. The condenser 12 is a heat radiation unit that radiates heat from the refrigerant discharged from the compressor 11 to the cooling water.

The condenser 12 causes heat exchange between the high-pressure side refrigerant discharged from the compressor 11 and the cooling water in the high-temperature cooling water circuit 20 to condense the high-pressure side refrigerant and heat the cooling water in the high-temperature cooling water circuit 20.

The cooling water in the high-temperature cooling water circuit 20 is a fluid as a heat medium. The cooling water in the high-temperature cooling water circuit 20 is a high-temperature heat medium. In the present embodiment, a liquid containing at least ethylene glycol, dimethylpolysiloxane, or nanofluid, or an antifreeze liquid is used as the cooling water of the high-temperature cooling water circuit 20. The high-temperature cooling water circuit 20 is a high-temperature heat medium circuit through which a high-temperature heat medium circulates.

The first expansion valve 13F is a first decompression unit that decompresses and expands a liquid-phase refrigerant flowing out of the condenser 12. The first expansion valve 13F is an electric expansion valve. The electric expansion valve is an electric variable throttle mechanism including a valve body configured to change a throttle opening and an electric actuator that changes the opening of the valve body. The first expansion valve 13F can fully close a refrigerant flow path.

The first expansion valve 13F is a refrigerant flow switching unit that causes switching between a state where the refrigerant flows through the front-seat side evaporator 14F and a state where the refrigerant does not flow through the front-seat side evaporator 14F. The operation of the first expansion valve 13F is controlled by a control signal output from the control device 60 illustrated in FIG. 3. The first expansion valve 13F may be a mechanical thermal expansion valve. In a case where the first expansion valve 13F is a mechanical thermal expansion valve, an on-off valve that opens and closes the refrigerant flow path on the first expansion valve 13F side needs to be provided separately from the first expansion valve 13F.

The front-seat side evaporator 14F is a first evaporation unit that causes heat exchange between the refrigerant flowing out of the first expansion valve 13F and the air blown into the vehicle interior to evaporate the refrigerant. In the front-seat side evaporator 14F, the refrigerant absorbs heat from the air blown into the vehicle interior. The front-seat side evaporator 14F is an air cooler that cools the air blown into the vehicle interior.

The front-seat side constant pressure valve 15F is a pressure adjusting unit that maintains the pressure of the refrigerant on the outlet side of the front-seat side evaporator 14F at a predetermined value. The front-seat side constant pressure valve 15F includes a mechanical variable throttle mechanism. Specifically, the front-seat side constant pressure valve 15F decreases the passage area (i.e., throttle opening) of the refrigerant passage when the pressure of the refrigerant on the outlet side of the front-seat side evaporator 14F falls below a predetermined value, and increases the passage area (i.e., throttle opening) of the refrigerant passage when the pressure of the refrigerant on the outlet side of the front-seat side evaporator 14F exceeds the predetermined value. The gas-phase refrigerant whose pressure has been adjusted by the front-seat side constant pressure valve 15F is sucked into the compressor 11 and compressed.

In a case where the flow rate of the circulating refrigerant circulating in the cycle fluctuates only a little, a fixed throttle including an orifice, a capillary tube, or the like may be adopted instead of the front-seat side constant pressure valve 15F.

The second expansion valve 13R is a second decompression unit that decompresses and expands a liquid-phase refrigerant flowing out of the condenser 12. The second expansion valve 13R is an electric expansion valve. The electric expansion valve is an electric variable throttle mechanism including a valve body configured to change a throttle opening and an electric actuator that changes the opening of the valve body. The second expansion valve 13R can fully close the refrigerant flow path.

The second expansion valve 13R is a refrigerant flow switching unit that causes switching between a state where the refrigerant flows through the rear-seat side evaporator 14R and a state where the refrigerant does not flow through the rear-seat side evaporator 14R.

The operation of the second expansion valve 13R is controlled by a control signal output from the control device 60. The second expansion valve 13R may be a mechanical thermal expansion valve. In a case where the second expansion valve 13R is a mechanical thermal expansion valve, an on-off valve that opens and closes the refrigerant flow path on the second expansion valve 13R side needs to be provided separately from the second expansion valve 13R.

The rear-seat side evaporator 14R is a second evaporation unit that causes heat exchange between the refrigerant flowing out of the second expansion valve 13R and the air blown into the vehicle interior to evaporate the refrigerant. In the rear-seat side evaporator 14R, the refrigerant absorbs heat from the air blown into the vehicle interior. The rear-seat side evaporator 14R is an air cooler that cools the air blown into the vehicle interior.

The rear-seat side constant pressure valve 15R is a pressure adjusting unit that maintains the pressure of the refrigerant on the outlet side of the rear-seat side evaporator 14R at a predetermined value. The rear-seat side constant pressure valve 15R includes a mechanical variable throttle mechanism. Specifically, the rear-seat side constant pressure valve 15R decreases the passage area (i.e., throttle opening) of the refrigerant passage when the pressure of the refrigerant on the outlet side of the rear-seat side evaporator 14R falls below a predetermined value, and increases the passage area (i.e., throttle opening) of the refrigerant passage when the pressure of the refrigerant on the outlet side of the rear-seat side evaporator 14R exceeds the predetermined value. The gas-phase refrigerant whose pressure has been adjusted by the rear-seat side constant pressure valve 15R is sucked into the compressor 11 and compressed.

In a case where the flow rate of the circulating refrigerant circulating in the cycle fluctuates only a little, a fixed throttle including an orifice, a capillary tube, or the like may be adopted instead of the rear-seat side constant pressure valve 15R.

The third expansion valve 13C is a third decompression unit that decompresses and expands a liquid-phase refrigerant flowing out of the condenser 12. The third expansion valve 13C is an electric expansion valve. The electric expansion valve is an electric variable throttle mechanism including a valve body configured to change a throttle opening and an electric actuator that changes the opening of the valve body. The third expansion valve 13C can fully close the refrigerant flow path.

The third expansion valve 13C is a refrigerant flow switching unit that causes switching between a state where the refrigerant flows through the cooling evaporator 14C and a state where the refrigerant does not flow through the cooling evaporator 14C. The operation of the third expansion valve 13C is controlled by a control signal output from the control device 60. The third expansion valve 13C may be a mechanical thermal expansion valve. In a case where the third expansion valve 13C is a mechanical thermal expansion valve, an on-off valve that opens and closes the refrigerant flow path on the third expansion valve 13C side needs to be provided separately from the third expansion valve 13C.

The cooling evaporator 14C is a third evaporation unit that causes heat exchange between the refrigerant flowing out of the third expansion valve 13C and the cooling water in a low-temperature cooling water circuit 30 to evaporate the refrigerant. The gas-phase refrigerant evaporated in the cooling evaporator 14C is sucked into the compressor 11 and compressed.

A liquid containing at least ethylene glycol, dimethylpolysiloxane, or nanofluid, or an antifreeze liquid is used as the cooling water of the low-temperature cooling water circuit 30. The low-temperature cooling water circuit 30 is a low-temperature heat medium circuit through which a low-temperature heat medium circulates.

In the high-temperature cooling water circuit 20, the condenser 12, a high-temperature side pump 21, a front-seat side heater core 22F, a rear-seat side heater core 22R, a high-temperature side radiator 23 (i.e., outside-air heat exchanger), a reservoir tank 24, an electric heater 25, a three-way valve 26, and a flow rate adjusting orifice 27 are disposed.

The high-temperature side pump 21 is a heat medium pump that sucks and discharges the cooling water. The high-temperature side pump 21 is an electric pump. The high-temperature side pump 21 is an electric pump having a constant discharge flow rate. The high-temperature side pump 21 may be an electric pump having a variable discharge flow rate.

The front-seat side heater core 22F is an air heater that causes heat exchange between the cooling water in the high-temperature cooling water circuit 20 and the air blown into the vehicle interior to heat the air blown into the vehicle interior. In the front-seat side heater core 22F, the cooling water radiates heat to the air blown into the vehicle interior. The front-seat side heater core 22F is a first heater core.

The rear-seat side heater core 22R is an air heater that causes heat exchange between the cooling water in the high-temperature cooling water circuit 20 and the air blown into the vehicle interior to heat the air blown into the vehicle interior. In the rear-seat side heater core 22R, the cooling water radiates heat to the air blown into the vehicle interior. The rear-seat side heater core 22R is a second heater core.

The rear-seat side heater core 22R is disposed in parallel with the front-seat side heater core 22F in the cooling water flow of the high-temperature cooling water circuit 20.

The high-temperature side radiator 23 causes heat exchange between the cooling water in the high-temperature cooling water circuit 20 and the outside air to radiate heat from the cooling water to the outside air. The high-temperature side radiator 23 is disposed in parallel with the front-seat side heater core 22F and the rear-seat side heater core 22R in the cooling water flow of the high-temperature cooling water circuit 20.

The high-temperature cooling water circuit 20 includes a radiator side branch part 20a, a radiator side merging part 20b, a heater core side branch part 20c, and a heater core side merging part 20d.

The radiator side branch part 20a causes the cooling water in the high-temperature cooling water circuit 20 to branch into the heater cores 22F and 22R side and the high-temperature side radiator 23 side. The radiator side branch part 20a is a first branch part.

The radiator side merging part 20b causes the cooling water in the high-temperature cooling water circuit 20 from the heater cores 22F and 22R side and the high-temperature side radiator 23 side to merge together. The radiator side merging part 20b is a first merging part.

The heater core side branch part 20c causes the cooling water in the high-temperature cooling water circuit 20 to branch into the front-seat side heater core 22F side and the rear-seat side heater core 22R side. The heater core side branch part is a second branch part.

The heater core side merging part 20d causes the cooling water in the high-temperature cooling water circuit 20 from the front-seat side heater core 22F side and the rear-seat side heater core 22R side to merge together. The heater core side merging part 20d is a second merging part.

The high-temperature cooling water circuit 20 includes a radiator cooling water flow path 20e, an inter-branch part cooling water flow path 20f, a front-seat side heater core cooling water flow path 20g, a rear-seat side heater core cooling water flow path 20h, an inter-merging part cooling water flow path 20i, and a condenser cooling water flow path 20k.

The radiator cooling water flow path 20e is a cooling water flow path (in other words, a heat medium flow path) extending from the radiator side branch part to the radiator side merging part 20b via the high-temperature side radiator 23.

The inter-branch part cooling water flow path 20f is a cooling water flow path (in other words, a heat medium flow path) between the radiator side branch part and the heater core side branch part 20c.

The front-seat side heater core cooling water flow path 20g is a cooling water flow path (in other words, a heat medium flow path) extending from the heater core side branch part 20c to the heater core side merging part 20d via the front-seat side heater core 22F.

The rear-seat side heater core cooling water flow path 20h is a cooling water flow path (in other words, a heat medium flow path) extending from the heater core side branch part 20c to the heater core side merging part 20d via the rear-seat side heater core 22R.

The inter-merging part cooling water flow path 20i is a cooling water flow path (in other words, a heat medium flow path) between the heater core side merging part 20d and the radiator side merging part 20b.

The reservoir tank 24 is a cooling water storage unit (in other words, a heat medium storing unit) that stores excess cooling water. By storing the excess cooling water in the reservoir tank 24, a decrease in the liquid amount of the cooling water circulating through each flow path can be suppressed.

The reservoir tank 24 is a sealed reservoir tank or an open-to-atmosphere reservoir tank. The sealed reservoir tank is a reservoir tank that brings the pressure at the liquid level of the stored cooling water to a predetermined pressure. The open-to-atmosphere reservoir tank is a reservoir tank that brings the pressure at the liquid level of the stored cooling water to the atmospheric pressure.

The reservoir tank 24 is disposed between the heater core side merging part 20d and the radiator side merging part 20b in the high-temperature cooling water circuit 20.

The electric heater 25 is an auxiliary heating unit that auxiliarily heats the cooling water in the high-temperature cooling water circuit 20. The electric heater 25 is an auxiliary heat source for heating the air by the heater cores 22F and 22R. For example, the electric heater 25 is a positive temperature coefficient (PTC) heater that generates heat by being supplied with electric power. The electric heater 25 is a Joule heat generation unit that generates Joule heat. The amount of heat generated by the electric heater 25 is controlled by a control voltage output from the control device 60.

The electric heater 25 is disposed between the radiator side branch part 20a and the heater core side branch part 20c in the high-temperature cooling water circuit 20.

The three-way valve 26 and the flow rate adjusting orifice 27 are disposed in the high-temperature cooling water circuit 20.

The three-way valve 26 is disposed at the radiator side branch part 20a of the high-temperature cooling water circuit 20. The three-way valve 26 is an electromagnetic three-way valve that adjusts an opening ratio between the cooling water flow path on the high-temperature side radiator 23 side and the cooling water flow paths on the heater cores 22F and 22R side. The three-way valve 26 optionally adjusts a flow rate ratio between the cooling water in the high-temperature cooling water circuit 20 flowing into the high-temperature side radiator 23 side and the cooling water in the high-temperature cooling water circuit 20 flowing into the heater cores 22F and 22R side.

The three-way valve 26 includes a radiator side flow rate adjusting unit 26a and a heater core side flow rate adjusting unit 26b. The radiator side flow rate adjusting unit 26a is a first flow rate adjusting unit that adjusts the opening of the cooling water flow path (that is, the radiator cooling water flow path 20e) on the high-temperature side radiator 23 side. The heater core side flow rate adjusting unit 26b is a second flow rate adjusting unit that adjusts the opening of the cooling water flow path (that is, the inter-branch part cooling water flow path 20f) on the heater core 22F and 22R side.

The flow rate adjusting orifice 27 is disposed at the heater core side branch part 20c of the high-temperature cooling water circuit 20. The flow rate adjusting orifice 27 is a fixed throttle that throttles at least one of the cooling water flow path on the front-seat side heater core 22F side and the cooling water flow path on the rear-seat side heater core 22R side. The flow rate adjusting orifice 27 is a pressure loss body that causes pressure loss in at least one of the cooling water flow path on the front-seat side heater core 22F side and the cooling water flow path on the rear-seat side heater core 22R side. The flow rate adjusting orifice 27 adjusts the flow rate ratio between the cooling water in the high-temperature cooling water circuit 20 flowing into the front-seat side heater core 22F and the cooling water in the high-temperature cooling water circuit 20 flowing into the rear-seat side heater core 22R to a predetermined flow rate ratio.

In the low-temperature cooling water circuit 30, the cooling evaporator 14C, a low-temperature side pump 31, and a low-temperature side radiator 32 are disposed.

The low-temperature side pump 31 is a heat medium pump that sucks and discharges the cooling water. The low-temperature side pump 31 is an electric pump. The low-temperature side pump 31 is an electric pump having a constant discharge flow rate. The low-temperature side pump 31 may be an electric pump having a variable discharge flow rate.

The low-temperature side radiator 32 is a heat absorber that causes heat exchange between the cooling water in the low-temperature cooling water circuit 30 and the outside air to cause the cooling water to absorb heat from the outside air.

An outdoor blower 40 is an outside air blowing unit that blows the outside air toward the high-temperature side radiator 23 and the low-temperature side radiator 32. The outdoor blower 40 is an electric blower that drives a fan with an electric motor. The operation of the outdoor blower 40 is controlled by the control device 60.

The high-temperature side radiator 23, the low-temperature side radiator 32, and the outdoor blower 40 are disposed in the foremost portion of the vehicle. Therefore, when the vehicle is traveling, the traveling wind can be applied to the high-temperature side radiator 23.

As shown in FIG. 2, the front-seat side evaporator 14F and the front-seat side heater core 22F are housed in a front-seat side air conditioning casing 50F of a front-seat side air conditioning unit 51F. The front-seat side air conditioning unit 50F is disposed inside a not-illustrated instrument panel in the front portion of the vehicle interior. The front-seat side air conditioning casing 51F is an air passage forming member that forms an air passage.

The front-seat side heater core 22F is disposed on the air flow downstream side of the front-seat side evaporator 14F in the air passage inside the front-seat side air conditioning casing 51F. A front-seat side inside/outside air switching box 52F and a front-seat side indoor blower 53F are disposed in the front-seat side air conditioning casing 51F.

The front-seat side inside/outside air switching box 52F is an inside/outside air switching unit that switches between and introduces the inside air and the outside air into the air passage in the front-seat side air conditioning casing 51F. The front-seat side indoor blower 53F sucks and blows the inside air and the outside air introduced into the air passage in the front-seat side air conditioning casing 51F through the front-seat side inside/outside air switching box 52F. The operation of the front-seat side indoor blower 53F is controlled by the control device 60.

In the air passage inside the front-seat side air conditioning casing 51F and between the front-seat side evaporator 14F and the front-seat side heater core 22F, a front-seat side air mix door 54F is disposed. The front-seat side air mix door 54F adjusts an air volume ratio between the cold air flowing into the front-seat side heater core 22F and the cold air flowing through a front-seat side cold air bypass passage 55F, in the cold air having passed through the front-seat side evaporator 14F. The front-seat side air mix door 54F is a first air mix door.

The front-seat side cold air bypass passage 55F is an air passage through which the cold air having passed through the front-seat side evaporator 14F flows while bypassing the front-seat side heater core 22F.

The front-seat side air mix door 54F is a rotary door having a rotation shaft rotatably supported to the front-seat side air conditioning casing 51F and a door base plate portion coupled to the rotation shaft. By adjusting the opening position of the front-seat side air mix door 54F, the temperature of the conditioned air blown into the vehicle interior from the front-seat side air conditioning casing 51F can be adjusted to a desired temperature.

The rotation shaft of the front-seat side air mix door 54F is driven by a front-seat side servomotor 56F. The operation of the front-seat side servomotor 56F is controlled by the control device 60.

The front-seat side air mix door 54F may be a sliding door that slides in a direction substantially orthogonal to the air flow. The sliding door may be a plate-shaped door formed of a rigid body. The sliding door may be a film door formed of a flexible film material.

The conditioned air whose temperature has been adjusted by the front-seat side air mix door 54F is blown out mainly into the vehicle interior front-seat side space from a front-seat side air outlet 57F formed in the front-seat side air conditioning casing 51F.

As shown by the reference numerals in parentheses in FIG. 2, the rear-seat side evaporator 14R and the rear-seat side heater core 22R are housed in a rear-seat side air conditioning casing 51R of a rear-seat side air conditioning unit 50R. Because the configuration of the rear-seat side air conditioning unit 50R is similar to the configuration of the front-seat side air conditioning unit 50F, the reference numerals corresponding to the rear-seat side air conditioning unit 50R are shown in parentheses in FIG. 2, and the rear-seat side air conditioning unit 50R is not illustrated.

The rear-seat side air conditioning unit 50R is disposed in the rear portion of the vehicle interior. For example, the rear-seat side air conditioning unit 50R is disposed on the side of the rear seat. The rear-seat side air conditioning casing 51R is an air passage forming member that forms the air passage.

The rear-seat side heater core 22R is disposed on the air flow downstream side of the rear-seat side evaporator 14R in the air passage inside the rear-seat side air conditioning casing 51R. A rear-seat side inside/outside air switching box 52R and a rear-seat side indoor blower 53R are disposed in the rear-seat side air conditioning casing 51R.

The rear-seat side inside/outside air switching box 52R is an inside/outside air switching unit that switches between and introduces the inside air and the outside air into the air passage in the rear-seat side air conditioning casing 51R. The rear-seat side indoor blower 53R sucks and blows the inside air and the outside air introduced into the air passage in the rear-seat side air conditioning casing 51R through the rear-seat side inside/outside air switching box 52R. The operation of the rear-seat side indoor blower 53R is controlled by the control device 60.

In the air passage inside the rear-seat side air conditioning casing 51R and between the rear-seat side evaporator 14R and the rear-seat side heater core 22R, a rear-seat side air mix door 54R is disposed. The rear-seat side air mix door 54R adjusts an air volume ratio between the cold air flowing into the rear-seat side heater core 22R and the cold air flowing through a rear-seat side cold air bypass passage in the cold air having passed through the rear-seat side evaporator 14R. The rear-seat side air mix door 54R is a second air mix door.

The rear-seat side cold air bypass passage 55R is an air passage through which the cold air having passed through the rear-seat side evaporator 14R flows while bypassing the rear-seat side heater core 22R.

The rear-seat side air mix door 54R is a rotary door having a rotation shaft rotatably supported to the rear-seat side air conditioning casing 51R and a door base plate portion coupled to the rotation shaft. By adjusting the opening position of the rear-seat side air mix door 54R, the temperature of the conditioned air blown into the vehicle interior from the rear-seat side air conditioning casing 51R can be adjusted to a desired temperature.

The rotation shaft of the rear-seat side air mix door 54R is driven by a rear-seat side servomotor 56R. The operation of the rear-seat side air mix door servomotor 56R for the rear-seat side air mix door is controlled by the control device 60.

The rear-seat side air mix door 54R may be a sliding door that slides in a direction substantially orthogonal to the air flow. The sliding door may be a plate-shaped door formed of a rigid body. The sliding door may be a film door formed of a flexible film material.

The conditioned air whose temperature has been adjusted by the rear-seat side air mix door 54R is blown out into the vehicle interior rear-seat side space from a rear-seat side air outlet 57R formed in the rear-seat side air conditioning casing 51R.

The control device 60 illustrated in FIG. 3 includes a known microcomputer including a central processing unit (CPU), a read only memory (ROM), a random access memory (RAM), and the like, and peripheral circuits thereof. The control device 60 performs various calculations and processes on the basis of a control program stored in the ROM. Various devices to be controlled are connected to an output side of the control device 60. The control device 60 is a controller that controls operation of the various devices to be controlled.

Examples of the devices to be controlled by the control device 60 include the compressor 11, the first expansion valve 13F, the second expansion valve 13R, the third expansion valve 13C, the high-temperature side pump 21, the electric heater 25, the three-way valve 26, the low-temperature side pump 31, the outdoor blower 40, the front-seat side indoor blower 53F, the rear-seat side indoor blower 53R, the front-seat side air mix door servomotor 56F, the rear-seat side air mix door servomotor 56R, and the like.

In the control device 60, software and hardware for controlling the electric motor of the compressor 11 constitute a refrigerant discharge performance control unit. In the control device 60, software and hardware for controlling the first expansion valve 13F and the second expansion valve 13R constitute a throttle control unit. In the control device 60, software and hardware for controlling the electric heater 25 constitute an auxiliary heating performance control unit.

In the control device 60, software and hardware for controlling the three-way valve 26 constitute a high-temperature heat medium flow control unit.

In the control device 60, software and hardware for controlling the outdoor blower 40 constitute an outside air blowing performance control unit.

In the control device 60, software and hardware for controlling the front-seat side indoor blower 53F and the rear-seat side indoor blower 53R constitute an air blowing performance control unit.

In the control device 60, software and hardware for controlling the front-seat side servomotor 56F and the rear-seat side servomotor 56R constitute an air volume ratio control unit.

The input side of the control device 60 is connected with various control sensors such as a front-seat side inside-air temperature sensor 61F, a rear-seat side inside-air temperature sensor 61R, an outside air temperature sensor 62, a solar radiation amount sensor 63, a front-seat side intake-air temperature sensor 64F, a rear-seat side intake-air temperature sensor 64R, a front-seat side evaporator temperature sensor 65F, a rear-seat side evaporator temperature sensor 65R, a cooling evaporator temperature sensor 65C, a front-seat side heater core temperature sensor 66F, and a rear-seat side heater core temperature sensor 66R.

The front-seat side inside-air temperature sensor 61F detects a vehicle interior temperature TrF (hereinafter, referred to as a front-seat side inside air temperature) of the vehicle interior front-seat side space. The rear-seat side inside-air temperature sensor 61R detects a vehicle interior temperature TrR (hereinafter, referred to as a rear-seat side inside air temperature) of the vehicle interior rear-seat side space. The outside air temperature sensor 62 detects a temperature Tam (hereinafter, referred to as an outside air temperature) of the vehicle exterior air. The solar radiation amount sensor 63 detects a solar radiation amount Ts in the vehicle interior.

The front-seat side intake-air temperature sensor 64F is an air temperature detection unit that detects a temperature TEinF of the air to be taken into the front-seat side evaporator 14F. The rear-seat side intake-air temperature sensor 64R is an air temperature detection unit that detects a temperature TEinR of the air to be taken into the rear-seat side evaporator 14R.

The front-seat side evaporator temperature sensor 65F is an evaporator temperature detection unit that detects a temperature TEF of the front-seat side evaporator 14F. The front-seat side evaporator temperature sensor 65F is, for example, a fin thermistor that detects the temperature of the heat exchange fins of the front-seat side evaporator 14F, a refrigerant temperature sensor that detects the temperature of the refrigerant flowing through the front-seat side evaporator 14F, or the like.

The rear-seat side evaporator temperature sensor 65R is an evaporator temperature detection unit that detects a temperature TER of the rear-seat side evaporator 14R. The rear-seat side evaporator temperature sensor 65R is, for example, a fin thermistor that detects the temperature of the heat exchange fins of the rear-seat side evaporator 14R, a refrigerant temperature sensor that detects the temperature of the refrigerant flowing through the rear-seat side evaporator 14R, or the like.

The cooling evaporator temperature sensor 65C is an evaporator temperature detection unit that detects a temperature TEC of the cooling evaporator 14C. The cooling evaporator temperature sensor 65C is, for example, a refrigerant temperature sensor or the like that detects the temperature of the refrigerant flowing through the cooling evaporator 14C.

The front-seat side heater core temperature sensor 66F is a first temperature detection unit that detects a temperature THinF of the cooling water flowing into the front-seat side heater core 22F. The rear-seat side heater core temperature sensor 66R is a second temperature detection unit that detects a temperature THinR of the cooling water flowing into the rear-seat side heater core 22R.

As illustrated in FIG. 1, the front-seat side heater core temperature sensor 66F is disposed between the heater core side branch part 20c and the front-seat side heater core 22F in the high-temperature cooling water circuit 20. As illustrated in FIG. 1, the rear-seat side heater core temperature sensor 66R is disposed between the heater core side branch part 20c and the rear-seat side heater core 22R in the high-temperature cooling water circuit 20.

Various not-illustrated operation switches are connected to the input side of the control device 60. The various operation switches are provided on an operation panel 70 illustrated in FIG. 3 and operated by an occupant. The operation panel 70 is disposed in the vicinity of the instrument panel in the front portion of the vehicle interior. Operation signals from the various operation switches are input to the control device 60.

The various operation switches include an automatic switch, an air conditioner switch, a front-seat side temperature setting switch, a front-seat side air volume setting switch, a front-seat side air blowing mode selector switch, a rear-seat side air conditioning switch, a rear-seat side temperature setting switch, a rear-seat side air volume setting switch, and a rear-seat side blowing mode selector switch.

The automatic switch is a switch for setting or cancelling automatic control operation of the vehicle air conditioner. The air conditioner switch is a switch for requiring at least the front-seat side evaporator 14F among the front-seat side evaporator 14F and the rear-seat side evaporator 14R to cool the air.

The front-seat side temperature setting switch is a switch for setting a target temperature of the vehicle interior front-seat side space. The front-seat side air volume setting switch is a switch for manually setting the air volume of the front-seat side indoor blower 53F. The front-seat side blowing mode selector switch is a switch for manually setting the blowing mode of the front-seat side air conditioning unit 50F.

The rear-seat side air conditioning switch is a switch for switching between the operation and the stop of the rear-seat side air conditioning unit 50R. The rear-seat side temperature setting switch is a switch for setting a target temperature of the vehicle interior rear-seat side space. The rear-seat side air volume setting switch is a switch for manually setting the air volume of the rear-seat side indoor blower 53R. The rear-seat side blowing mode selector switch is a switch for manually setting the blowing mode of the rear-seat side air conditioning unit 50R.

Next, the operation in the above configuration is described. In a case where the automatic switch of the operation panel 70 is turned on by the occupant, the control device 60 switches the operation mode on the basis of the operation states of the air conditioner switch, the rear-seat side air conditioning switch, and the like, a front-seat side target blowing temperature TAO F, and the like, and a control map. The operation mode includes at least a single cooling mode, a single first dehumidifying and heating mode, a single second dehumidifying and heating mode, a single third dehumidifying and heating mode, a single fourth dehumidifying and heating mode, a single heating mode, a dual cooling mode, a dual first dehumidifying and heating mode, a dual second dehumidifying and heating mode, a dual third dehumidifying and heating mode, a dual fourth dehumidifying and heating mode, and a dual heating mode.

The front-seat side target blowing temperature TAOF is a target temperature of the blown air blown into the vehicle interior by the front-seat side air conditioning unit 50F. The control device 60 calculates the front-seat side target blowing temperature TAOF on the basis of the following mathematical formula.

$$TAOF = Kset \times TsetF - Kr \times TrF - Kam \times Tam - Ks \times Ts + C$$

In this formula, TsetF is the vehicle interior set temperature set by the front-seat side temperature setting switch of the operation panel 70, TrF is the front-seat side inside air temperature detected by the front-seat side inside-air temperature sensor 61F, Tam is the outside air temperature detected by the outside air temperature sensor 62, and Ts is the solar radiation amount detected by the solar radiation amount sensor 63. Kset, Kr, Kam, and Ks are control gains, and C is a correction constant.

In a case where the air conditioner switch is turned on by the occupant and the rear-seat side air conditioning switch is turned off by the occupant, the mode is switched to the single cooling mode in the low temperature range of the front-seat side target blowing temperature TAO F, and the mode is switched in the order of the single first dehumidifying and heating mode, the single second dehumidifying and heating mode, the single third dehumidifying and heating mode, and the single fourth dehumidifying and heating mode as the front-seat side target blowing temperature TAOF increases. The threshold of the front-seat side target blowing temperature TAOF increases as an intake air temperature TEinF of the front-seat side evaporator 14F increases.

In a case where the air conditioner switch is turned off by the occupant and the rear-seat side air conditioning switch is turned off by the occupant, the mode is switched to the single heating mode in the high temperature range of the front-seat side target blowing temperature TAO F.

In a case where the air conditioner switch is turned on by the occupant and the rear-seat side air conditioning switch is turned on by the occupant, the mode is switched to the dual cooling mode in the low temperature range of the front-seat side target blowing temperature TAOF, and the mode is switched in the order of the dual first dehumidifying and heating mode, the dual second dehumidifying and heating mode, the dual third dehumidifying and heating mode, and the dual fourth dehumidifying and heating mode as the front-seat side target blowing temperature TAOF increases. The threshold of the front-seat side target blowing temperature TAOF increases as an intake air temperature TEinF of the front-seat side evaporator 14F increases.

In a case where the air conditioner switch is turned off by the occupant and the rear-seat side air conditioning switch is turned on by the occupant, the mode is switched to the dual heating mode in the high temperature range of the front-seat side target blowing temperature TAO F.

In the single cooling mode, the vehicle interior is cooled by cooling the air blown into the vehicle interior by the front-seat side evaporator 14F.

In the single first dehumidifying and heating mode, the single second dehumidifying and heating mode, the single third dehumidifying and heating mode, and the single fourth dehumidifying and heating mode, the air blown into the vehicle interior is cooled and dehumidified by the front-seat side evaporator 14F, and the air cooled and dehumidified by the front-seat side evaporator 14F is heated by the front-seat side heater core 22F to dehumidify and heat the vehicle interior. In the single heating mode, the vehicle interior is heated by heating the air blown into the vehicle interior by the front-seat side heater core 22F.

In the dual cooling mode, the vehicle interior front-seat side space is cooled by cooling the air blown into the vehicle interior front-seat side space by the front-seat side evaporator 14F, and the vehicle interior rear-seat side space is cooled by cooling the air blown into the vehicle interior rear-seat side space by the rear-seat side evaporator 14R.

In the dual first dehumidifying and heating mode, the dual second dehumidifying and heating mode, the dual third dehumidifying and heating mode, and the dual fourth dehumidifying and heating mode, the vehicle interior front-seat side space is dehumidified and heated by cooling and dehumidifying the air blown into the vehicle interior front-seat side space by the front-seat side evaporator 14F and by heating the air cooled and dehumidified by the front-seat side evaporator 14F by the front-seat side heater core 22F. In addition, the vehicle interior rear-seat side space is dehumidified and heated by cooling and dehumidifying the air blown into the vehicle interior rear-seat side space by the rear-seat side evaporator 14R and by heating the air cooled and dehumidified by the rear-seat side evaporator 14R by the rear-seat side heater core 22R. In the dual heating mode, the vehicle interior front-seat side space is heated by heating the air blown into the vehicle interior front-seat side space by the front-seat side heater core 22F, and the vehicle interior rear-seat side space is heated by heating the air blown into the vehicle interior rear-seat side space by the rear-seat side heater core 22R.

In the single first dehumidifying and heating mode, because the amount of heat of the cooling water in the high-temperature cooling water circuit 20 is excessive with respect to the amount of heat required for the front-seat side heater core 22F, the excessive heat of the cooling water in the high-temperature cooling water circuit 20 is radiated to the outside air by the high-temperature side radiator 23.

In the single second dehumidifying and heating mode, the low-temperature side radiator 32 absorbs heat from the outside air to increase the amount of heat radiated from the front-seat side heater core 22F as compared to the single first dehumidifying and heating mode.

In the single third dehumidifying and heating mode, by increasing the rotation speed of the compressor 11 as compared to the single second dehumidifying and heating mode, the amount of heat absorbed from the outside air by the low-temperature side radiator 32 is increased and the amount of heat radiated from the front-seat side heater core 22F is increased.

In the single fourth dehumidifying and heating mode, the electric heater 25 generates heat to increase the amount of heat radiated from the front-seat side heater core 22F as compared to the single third dehumidifying and heating mode.

In the dual first dehumidifying and heating mode, because the amount of heat of the cooling water in the high-temperature cooling water circuit 20 is excessive with respect to the amount of heat required for the front-seat side heater core 22F and the rear-seat side heater core 22R, the excessive heat of the cooling water in the high-temperature cooling water circuit 20 is radiated to the outside air by the high-temperature side radiator 23. The dual first dehumidifying and heating mode is a heat radiation mode in which the high-temperature side radiator 23 radiates heat to the outside air.

In the dual second dehumidifying and heating mode, the low-temperature side radiator 32 absorbs heat from the outside air to increase the amount of heat radiated from the front-seat side heater core 22F and the rear-seat side heater core 22R as compared to the dual first dehumidifying and heating mode. The dual second dehumidifying and heating mode is a heat absorption mode in which the low-temperature side radiator 32 absorbs heat from the outside air.

In the dual third dehumidifying and heating mode, by increasing the rotation speed of the compressor 11 as compared to the dual second dehumidifying and heating mode, the amount of heat absorbed from the outside air by the low-temperature side radiator 32 is increased and the amount of heat radiated from the front-seat side heater core 22F and the rear-seat side heater core 22R is increased.

In the dual fourth dehumidifying and heating mode, the electric heater 25 generates heat to increase the amount of heat radiated from the front-seat side heater core 22F and the rear-seat side heater core 22R as compared to the dual third dehumidifying and heating mode.

Next, operations in the single cooling mode, the single first dehumidifying and heating mode, the single second dehumidifying and heating mode, the single third dehumidifying and heating mode, the single fourth dehumidifying and heating mode, the single heating mode, the dual cooling mode, the dual first dehumidifying and heating mode, the dual second dehumidifying and heating mode, the dual third dehumidifying and heating mode, the dual fourth dehumidifying and heating mode, and the dual heating mode are described.

In the cooling mode, the single cooling mode, the single first dehumidifying and heating mode, the single second dehumidifying and heating mode, the single third dehumidifying and heating mode, the single fourth dehumidifying and heating mode, the single heating mode, the dual cooling mode, the dual first dehumidifying and heating mode, the dual second dehumidifying and heating mode, the dual third dehumidifying and heating mode, the dual fourth dehumidifying and heating mode, and the dual heating mode, the control device 60 determines the operating states of various devices to be controlled (in other words, control signals output to the various devices to be controlled) connected to the control device 60 on the basis of the front-seat side target blowing temperature TAOF, detection signals from the sensor group, and the like.

(1) Single Cooling Mode

In the single cooling mode, the control device 60 operates the compressor 11 and the high-temperature side pump 21 to bring the first expansion valve 13F into the throttling state in which the refrigerant decompression action is exerted, closes the second expansion valve 13R, and closes the third expansion valve 13C.

In the single cooling mode, the control device 60 controls the rotation speed Nc of the compressor 11 so that the front-seat side evaporator temperature TEF detected by the front-seat side evaporator temperature sensor 65F approaches the target front-seat side evaporator temperature TEOF. The target front-seat side evaporator temperature TEOF is determined based on the front-seat side target blowing temperature TAOF with reference to a control map stored in advance in the control device 60.

In the single cooling mode, the control device 60 operates the front-seat side indoor blower 53F and stops the rear-seat side indoor blower 53R.

In the single cooling mode, the control device 60 controls the three-way valve 26 so that a radiator side flow rate ratio Rr decreases as a target temperature THOF (hereinafter, referred to as a target front-seat side heater core temperature) of the cooling water flowing into the front-seat side heater core 22F increases and the radiator side flow rate ratio Rr increases as the target front-seat side heater core temperature THOF decreases. In this example, the target front-seat side heater core temperature THOF is equal to the front-seat side target blowing temperature TAOF.

The radiator side flow rate ratio Rr is a flow rate ratio between the cooling water flowing into the high-temperature side radiator 23 and the cooling water flowing into the front-seat side heater core 22F and the rear-seat side heater core 22R.

That is, in the single cooling mode, the control device 60 controls the three-way valve 26 so that the distribution ratio of the cooling water to the high-temperature side radiator 23 decreases as the front-seat side target blowing temperature TAOF increases and the distribution ratio of the cooling water to the high-temperature side radiator 23 increases as the front-seat side target blowing temperature TAOF decreases.

As a result, in the refrigeration cycle device 10 in the single cooling mode, the refrigerant flows as indicated by broken arrows in FIG. 1, and the state of the refrigerant circulating in the cycle changes as follows.

That is, the high-pressure refrigerant discharged from the compressor 11 flows into the condenser 12. The refrigerant flowing into the condenser 12 radiates heat to the cooling water in the high-temperature cooling water circuit 20. As a result, the refrigerant is cooled and condensed in the condenser 12.

The refrigerant flowing out of the condenser 12 flows into the first expansion valve 13F, and is decompressed and expanded until the refrigerant becomes the low-pressure refrigerant at the first expansion valve 13F. The low-pressure refrigerant decompressed at the first expansion valve 13F flows into the front-seat side evaporator 14F, absorbs heat from the air blown into the vehicle interior, and evaporates. As a result, the air blown into the vehicle interior is cooled.

The refrigerant flowing out of the front-seat side evaporator 14F flows toward the suction side of the compressor 11 and is compressed again at the compressor 11.

As described above, in the single cooling mode, the low-pressure refrigerant absorbs heat from the air at the front-seat side evaporator 14F, and the cooled air can be blown into the vehicle interior. As a result, the vehicle interior can be cooled.

In the high-temperature cooling water circuit 20 in the single cooling mode, as indicated by the broken arrows in FIG. 1, the cooling water in the high-temperature cooling water circuit 20 circulates through the high-temperature side radiator 23, and the heat is radiated from the cooling water to the outside air by the high-temperature side radiator 23.

As indicated by solid arrows in FIG. 1, the cooling water in the high-temperature cooling water circuit 20 also circulates in the front-seat side heater core 22F, but the amount of heat radiated from the cooling water to the air in the front-seat side heater core 22F is adjusted by the front-seat side air mix door 54F.

The control signal output to the servomotor of the front-seat side air mix door 54F is determined such that the temperature of the conditioned air whose temperature has been adjusted by the front-seat side air mix door 54F becomes the front-seat side target blowing temperature TAOF. Specifically, the opening of the front-seat side air mix door 54F is determined based on the front-seat side target blowing temperature TAOF, the temperature TEF of the front-seat side evaporator 14F, the temperature THinF of the cooling water flowing into the front-seat side heater core 22F, and the like.

At this time, as indicated by the solid arrows in FIG. 1, the cooling water in the high-temperature cooling water circuit 20 circulates also in the rear-seat side heater core 22R, but because the rear-seat side indoor blower 53R is not operating, heat is hardly radiated from the cooling water to the air in the rear-seat side heater core 22R.

(2) Single First Dehumidifying and Heating Mode

In the single first dehumidifying and heating mode, the control device 60 operates the compressor 11 and the high-temperature side pump 21 to bring the first expansion valve 13F into the throttling state in which the refrigerant decompression action is exerted, closes the second expansion valve 13R, and closes the third expansion valve 13C.

In the single first dehumidifying and heating mode, the control device 60 controls the rotation speed Nc of the compressor 11 similarly to the single cooling mode.

In the single first dehumidifying and heating mode, the control device 60 controls the three-way valve 26 similarly to the single cooling mode so that the radiator side flow rate ratio Rr decreases as the target front-seat side heater core temperature THOF increases and the radiator side flow rate ratio Rr increases as the target front-seat side heater core temperature THOF decreases.

In the refrigeration cycle device 10 in the single first dehumidifying and heating mode, the refrigerant flows as indicated by the broken arrows in FIG. 1, and the state of the refrigerant circulating in the cycle changes as follows.

That is, the high-pressure refrigerant discharged from the compressor 11 flows into the condenser 12, exchanges heat with the cooling water in the high-temperature cooling water circuit 20, and radiates heat. As a result, the cooling water in the high-temperature cooling water circuit 20 is heated.

The refrigerant flowing out of the condenser 12 flows into the first expansion valve 13F, and is decompressed and expanded until the refrigerant becomes the low-pressure refrigerant at the first expansion valve 13F. The low-pressure refrigerant decompressed at the first expansion valve 13F flows into the front-seat side evaporator 14F, absorbs heat from the air blown into the vehicle interior, and evaporates. As a result, the air blown into the vehicle interior is cooled and dehumidified.

The refrigerant flowing out of the front-seat side evaporator 14F flows toward the suction side of the compressor 11 and is compressed again at the compressor 11.

In the high-temperature cooling water circuit 20 in the single first dehumidifying and heating mode, as indicated by the solid arrows in FIG. 1, the cooling water in the high-temperature cooling water circuit 20 circulates through the front-seat side heater core 22F.

The control signal output to the servomotor of the front-seat side air mix door 54F is determined such that the front-seat side air mix door 54F is located at the position indicated by two-dot chain lines in FIG. 2 to fully open the air passage of the front-seat side heater core 22F, and the entire flow rate of the air having passed through the front-seat side evaporator 14F passes through the front-seat side heater core 22F.

As a result, heat is radiated from the cooling water in the high-temperature cooling water circuit 20 to the air blown into the vehicle interior by the front-seat side heater core 22F. Accordingly, the air cooled and dehumidified by the front-seat side evaporator 14F is heated by the front-seat side heater core 22F and blown into the vehicle interior.

At this time, as indicated by the solid arrows in FIG. 1, the cooling water in the high-temperature cooling water circuit 20 circulates also in the rear-seat side heater core 22R, but because the rear-seat side indoor blower 53R is not operating, heat is hardly radiated from the cooling water to the air in the rear-seat side heater core 22R.

At the same time, in the high-temperature cooling water circuit 20, as indicated by the broken arrows in FIG. 1, the cooling water circulates through the high-temperature side radiator 23, and the heat is radiated from the cooling water to the outside air by the high-temperature side radiator 23.

As described above, in the single first dehumidifying and heating mode, the heat of the high-pressure refrigerant discharged from the compressor 11 is radiated to the cooling water in the high-temperature cooling water circuit 20 at the condenser 12, the heat of the cooling water in the high-temperature cooling water circuit 20 is radiated to the air at the front-seat side heater core 22F, and the air heated by the front-seat side heater core 22F can be blown into the vehicle interior.

The front-seat side heater core 22F heats the air cooled and dehumidified at the front-seat side evaporator 14F. As a result, the vehicle interior can be dehumidified and heated.

Because the single first dehumidifying and heating mode is performed at the front-seat side target blowing temperature TAOF in a relatively low temperature region, the blown air temperature of the front-seat side heater core 22F may be relatively low. Therefore, the amount of heat of the cooling water in the high-temperature cooling water circuit 20 is excessive with respect to the amount of heat required by the front-seat side heater core 22F.

The excess heat of the cooling water in the high-temperature cooling water circuit 20 is radiated to the outside air at the high-temperature side radiator 23.

In the single first dehumidifying and heating mode, the flow rate of the cooling water in the high-temperature cooling water circuit 20 flowing through the high-temperature side radiator 23 may only be a flow rate that can radiate the excessive heat of the cooling water in the high-temperature cooling water circuit 20 to the outside air.

Therefore, in the first dehumidifying and heating mode, the opening is set so that only the excessive heat of the cooling water in the high-temperature cooling water circuit 20 can be radiated to the outside air in the high-temperature side radiator 23.

As described above, in the single first dehumidifying and heating mode, the control device 60 controls the three-way valve 26 so that the radiator side flow rate ratio Rr decreases as the target front-seat side heater core temperature THOF increases and the radiator side flow rate ratio Rr increases as the target front-seat side heater core temperature THOF decreases. As a result, the temperature THinF of the cooling water flowing into the front-seat side heater core 22F can be made close to the target front-seat side heater core temperature THOF.

(3) Single Second Dehumidifying and Heating Mode

Because the single second dehumidifying and heating mode is performed at the front-seat side target blowing temperature TAOF in a higher temperature region as compared to the single first dehumidifying and heating mode, the blown air temperature in the front-seat side heater core 22F needs to be higher than in the single first dehumidifying and heating mode.

In the single second dehumidifying and heating mode, the control device operates the compressor 11, the high-temperature side pump 21, and the low-temperature side pump 31.

In the single second dehumidifying and heating mode, the control device controls the rotation speed Nc of the compressor 11 similarly to the single first dehumidifying and heating mode.

In the single second dehumidifying and heating mode, the control device opens the first expansion valve 13F at a throttle opening, closes the second expansion valve 13R, and opens the third expansion valve 13C at a throttle opening.

In the single second dehumidifying and heating mode, the control device controls the three-way valve 26 similarly to the single first dehumidifying and heating mode so that the radiator side flow rate ratio Rr decreases as the target front-seat side heater core temperature THOF increases and the radiator side flow rate ratio Rr increases as the target front-seat side heater core temperature THOF decreases.

In the refrigeration cycle device 10 in the single second dehumidifying and heating mode, the refrigerant flows as indicated by the broken arrows and the solid arrows in FIG. 1, and the state of the refrigerant circulating in the cycle changes as follows.

That is, in the refrigeration cycle device 10, as illustrated in the broken arrows in FIG. 1, the high-pressure refrigerant discharged from the compressor 11 flows into the condenser 12, exchanges heat with the cooling water in the high-temperature cooling water circuit 20, and radiates heat. As a result, the cooling water in the high-temperature cooling water circuit 20 is heated.

The refrigerant flowing out of the condenser 12 flows into the first expansion valve 13F, and is decompressed and expanded until the refrigerant becomes the low-pressure refrigerant at the first expansion valve 13F. The low-pressure refrigerant decompressed at the first expansion valve 13F flows into the front-seat side evaporator 14F, absorbs heat from the air blown into the vehicle interior, and evaporates. As a result, the air blown into the vehicle interior is cooled and dehumidified.

The refrigerant flowing out of the front-seat side evaporator 14F flows toward the suction side of the compressor 11 and is compressed again at the compressor 11.

At the same time, in the refrigeration cycle device 10, as indicated by the solid arrows in FIG. 1, the refrigerant flowing out of the condenser 12 flows into the third expansion valve 13C and is decompressed and expanded at the third expansion valve 13C until the refrigerant becomes the low-pressure refrigerant. The low-pressure refrigerant decompressed at the third expansion valve 13C flows into the cooling evaporator 14C, absorbs heat from the cooling water in the low-temperature cooling water circuit 30, and evaporates. As a result, the cooling water in the low-temperature cooling water circuit 30 is cooled.

In the high-temperature cooling water circuit 20 in the single second dehumidifying and heating mode, as indicated by the solid arrows in FIG. 1, the cooling water in the high-temperature cooling water circuit 20 circulates through the front-seat side heater core 22F.

The control signal output to the servomotor of the front-seat side air mix door 54F is determined such that the front-seat side air mix door 54F is located at the position indicated by the two-dot chain lines in FIG. 2 to fully open the air passage of the front-seat side heater core 22F, and the entire flow rate of the ventilation air having passed through the front-seat side evaporator 14F passes through the front-seat side heater core 22F.

As a result, heat is radiated from the cooling water in the high-temperature cooling water circuit 20 to the air blown into the vehicle interior by the front-seat side heater core 22F. Accordingly, the air cooled and dehumidified by the front-seat side evaporator 14F is heated by the front-seat side heater core 22F and blown into the vehicle interior.

At this time, as indicated by the solid arrows in FIG. 1, the cooling water in the high-temperature cooling water circuit 20 circulates also in the rear-seat side heater core 22R, but because the rear-seat side indoor blower 53R is not operating, heat is hardly radiated from the cooling water to the air in the rear-seat side heater core 22R.

At the same time, in the high-temperature cooling water circuit 20, as indicated by the broken arrows in FIG. 1, the cooling water circulates through the high-temperature side radiator 23, and the heat is radiated from the cooling water to the outside air by the high-temperature side radiator 23.

In the low-temperature cooling water circuit 30 in the single second dehumidifying and heating mode, as indicated by the solid arrows in FIG. 1, the cooling water in the low-temperature cooling water circuit 30 circulates through the low-temperature side radiator 32, and the heat is absorbed from the outside air by the cooling water in the low-temperature cooling water circuit 30 at the low-temperature side radiator 32.

As described above, in the single second dehumidifying and heating mode, the heat of the high-pressure refrigerant discharged from the compressor 11 is radiated to the cooling water in the high-temperature cooling water circuit 20 at the condenser 12, the heat of the cooling water in the high-temperature cooling water circuit 20 is radiated to the air at the front-seat side heater core 22F, and the air heated by the front-seat side heater core 22F can be blown into the vehicle interior.

The front-seat side heater core 22F heats the air cooled and dehumidified at the front-seat side evaporator 14F. As a result, the vehicle interior can be dehumidified and heated.

In the single second dehumidifying and heating mode, because the cooling water in the low-temperature cooling water circuit 30 absorbs heat from outside air at the low-temperature side radiator 32, the amount of heat available to the front-seat side heater core 22F can be increased and the blown air temperature of the front-seat side heater core 22F can be increased as compared to the single first dehumidifying and heating mode.

As described above, in the single second dehumidifying and heating mode, the control device 60 controls the three-way valve 26 so that the radiator side flow rate ratio Rr decreases as the target front-seat side heater core temperature THOF increases and the radiator side flow rate ratio Rr increases as the target front-seat side heater core temperature THOF decreases. As a result, the temperature THinF of the cooling water flowing into the front-seat side heater core 22F can be made close to the target front-seat side heater core temperature THOF.

(4) Single Third Dehumidifying and Heating Mode

Because the single third dehumidifying and heating mode is performed at the front-seat side target blowing temperature TAOF in a higher temperature region as compared to the single second dehumidifying and heating mode, the blown air temperature in the front-seat side heater core 22F needs to be higher than in the single second dehumidifying and heating mode.

In the single third dehumidifying and heating mode, the control device 60 controls the three-way valve 26 so that the radiator side flow rate ratio Rr is minimized. That is, the control device 60 controls the three-way valve 26 so that the cooling water does not flow into the high-temperature side radiator 23.

In the high-temperature cooling water circuit 20 in the single third dehumidifying and heating mode, as indicated by the solid arrows in FIG. 1, the cooling water in the high-temperature cooling water circuit 20 circulates through the front-seat side heater core 22F.

The control signal output to the servomotor of the front-seat side air mix door 54F is determined such that the front-seat side air mix door 54F is located at the position indicated by the two-dot chain lines in FIG. 2 to fully open the air passage of the front-seat side heater core 22F, and the entire flow rate of the ventilation air having passed through the front-seat side evaporator 14F passes through the front-seat side heater core 22F.

As a result, heat is radiated from the cooling water in the high-temperature cooling water circuit 20 to the air blown into the vehicle interior by the front-seat side heater core 22F. Accordingly, the air cooled and dehumidified by the front-seat side evaporator 14F is heated by the front-seat side heater core 22F and blown into the vehicle interior.

At this time, as indicated by the solid arrows in FIG. 1, the cooling water in the high-temperature cooling water circuit 20 circulates also in the rear-seat side heater core 22R, but because the rear-seat side indoor blower 53R is not operating, heat is hardly radiated from the cooling water to the air in the rear-seat side heater core 22R.

In the single third dehumidifying and heating mode, the amount of heat absorbed in the low-temperature side radiator 32 from the outside air is increased more than in the single second dehumidifying and heating mode. Specifically, the rotation speed Nc of the compressor 11 is set higher than that in the second dehumidifying and heating mode. That is, the rotation speed Nc of the compressor 11 is set higher than the rotation speed determined based on the target front-seat side evaporator temperature TEOF.

As a result, as compared to the single second dehumidifying and heating mode, the amount of heat available in the front-seat side heater core 22F can be increased and the blown air temperature of the front-seat side heater core 22F can be increased.

As described above, in the single third dehumidifying and heating mode, the control device 60 controls the three-way valve 26 so that the rotation speed Nc of the compressor 11 increases as the target front-seat side heater core temperature THOF increases and the rotation speed Nc of the compressor 11 decreases as the target front-seat side heater core temperature THOF decreases. As a result, the temperature THinF of the cooling water flowing into the front-seat side heater core 22F can be made close to the target front-seat side heater core temperature THOF.

(5) Single Fourth Dehumidifying and Heating Mode

Because the single fourth dehumidifying and heating mode is performed at the front-seat side target blowing temperature TAOF in a higher temperature region as compared to the single third dehumidifying and heating mode, the blown air temperature in the front-seat side heater core 22F needs to be higher than in the single third dehumidifying and heating mode.

In the single fourth dehumidifying and heating mode, the control device 60 controls the three-way valve 26 similarly to the single third dehumidifying and heating mode. That is, the control device 60 controls the three-way valve 26 so that the cooling water does not flow into the high-temperature side radiator 23.

Therefore, in the high-temperature cooling water circuit 20 in the single fourth dehumidifying and heating mode, as indicated by the solid arrows in FIG. 1, the cooling water in the high-temperature cooling water circuit 20 circulates through the front-seat side heater core 22F.

The control signal output to the servomotor of the front-seat side air mix door 54F is determined such that the front-seat side air mix door 54F is located at the position indicated by the two-dot chain lines in FIG. 2 to fully open the air passage of the front-seat side heater core 22F, and the entire flow rate of the ventilation air having passed through the front-seat side evaporator 14F passes through the front-seat side heater core 22F.

As a result, heat is radiated from the cooling water in the high-temperature cooling water circuit 20 to the air blown into the vehicle interior by the front-seat side heater core 22F. Accordingly, the air cooled and dehumidified by the front-seat side evaporator 14F is heated by the front-seat side heater core 22F and blown into the vehicle interior.

At this time, as indicated by the solid arrows in FIG. 1, the cooling water in the high-temperature cooling water circuit 20 circulates also in the rear-seat side heater core 22R, but because the rear-seat side indoor blower 53R is not operating, heat is hardly radiated from the cooling water to the air in the rear-seat side heater core 22R.

In the single fourth dehumidifying and heating mode, the rotation speed Nc of the compressor 11 is set to the upper limit rotation speed, and meanwhile, the amount of heating heat is increased by operating the electric heater 25 as compared to the single third dehumidifying and heating mode.

As a result, as compared to the single third dehumidifying and heating mode, the amount of heat available in the front-seat side heater core 22F can be increased and the blown air temperature of the front-seat side heater core 22F can be increased.

As described above, in the single fourth dehumidifying and heating mode, the control device 60 controls the three-way valve 26 so that the output power of the electric heater 25 increases as the target front-seat side heater core temperature THOF increases and the output power of the electric heater 25 decreases as the target front-seat side heater core temperature THOF decreases. As a result, the temperature THinF of the cooling water flowing into the front-seat side heater core 22F can be made close to the target front-seat side heater core temperature THOF.

(6) Single Heating Mode

In the single heating mode, the control device 60 operates the compressor 11 and the high-temperature side pump 21, closes the first expansion valve 13F, closes the second expansion valve 13R, and brings the third expansion valve 13C into the throttling state in which the refrigerant decompression action is exerted.

In the single heating mode, the control device 60 controls the rotation speed Nc of the compressor 11 so that the temperature THinF (that is, the temperature of the cooling water flowing into the front-seat side heater core 22F) of the cooling water detected by the front-seat side heater core temperature sensor 66F approaches the target front-seat side heater core temperature THOF. The target front-seat side heater core temperature THOF is determined based on the front-seat side target blowing temperature TAOF with reference to a control map stored in advance in the control device 60.

In the single heating mode, the control device 60 operates the front-seat side indoor blower 53F and stops the rear-seat side indoor blower 53R.

In the single heating mode, the control device 60 controls the three-way valve 26 so that the radiator side flow rate ratio Rr is minimized. That is, the control device 60 controls the three-way valve 26 so that the cooling water does not flow into the high-temperature side radiator 23.

As a result, in the refrigeration cycle device 10 in the single heating mode, the refrigerant flows as indicated by the solid arrows in FIG. 1, and the state of the refrigerant circulating in the cycle changes as follows.

That is, the high-pressure refrigerant discharged from the compressor 11 flows into the condenser 12. The refrigerant flowing into the condenser 12 radiates heat to the cooling water in the high-temperature cooling water circuit 20. As a result, the refrigerant is cooled and condensed in the condenser 12.

The refrigerant flowing out of the condenser 12 flows into the third expansion valve 13C, and is decompressed and expanded until the refrigerant becomes the low-pressure refrigerant at the third expansion valve 13C. The low-pressure refrigerant decompressed at the third expansion valve 13C flows into the cooling evaporator 14C, absorbs heat from the cooling water in the low-temperature cooling water circuit 30, and evaporates. As a result, the cooling water in the low-temperature cooling water circuit 30 is cooled.

The refrigerant flowing out of the cooling evaporator 14C flows toward the suction side of the compressor 11 and is compressed again at the compressor 11.

As described above, in the single heating mode, the low-pressure refrigerant can absorb heat from the cooling water in the low-temperature cooling water circuit 30 at the cooling evaporator 14C, and the cooled cooling water in the low-temperature cooling water circuit 30 can flow into the low-temperature side radiator 32. As a result, heat can be absorbed from the outside air at the low-temperature side radiator 32.

In the high-temperature cooling water circuit 20 in the single heating mode, as indicated by the solid arrows in FIG. 1, the cooling water in the high-temperature cooling water circuit 20 circulates through the front-seat side heater core 22F. The control signal output to the servomotor of the front-seat side air mix door 54F is determined such that the front-seat side air mix door 54F is located at the position indicated by the two-dot chain lines in FIG. 2 to fully open the air passage of the front-seat side heater core 22F, and the entire flow rate of the ventilation air having passed through the front-seat side evaporator 14F passes through the front-seat side heater core 22F. As a result, heat is radiated from the cooling water in the high-temperature cooling water circuit 20 to the air blown into the vehicle interior by the front-seat side heater core 22F. Therefore, the air blown into the vehicle interior is heated by the front-seat side heater core 22F, and the vehicle interior can be heated.

At this time, as indicated by the solid arrows in FIG. 1, the cooling water in the high-temperature cooling water circuit 20 circulates also in the rear-seat side heater core 22R, but because the rear-seat side indoor blower 53R is not operating, heat is hardly radiated from the cooling water to the air in the rear-seat side heater core 22R.

In the single heating mode, the control device 60 causes the rotation speed Nc of the compressor 11 and the output power of the electric heater 25 to increase as the target front-seat side heater core temperature THOF increases and causes the rotation speed Nc of the compressor 11 and the output power of the electric heater 25 to decrease as the target front-seat side heater core temperature THOF decreases. As a result, the temperature THinF of the cooling water flowing into the front-seat side heater core 22F can be made close to the target front-seat side heater core temperature THOF.

(7) Dual Cooling Mode

In the dual cooling mode, in contrast to the single cooling mode, the second expansion valve 13R is brought into the throttling state in which the refrigerant decompression action is exerted, and the rear-seat side indoor blower 53R is operated.

As a result, in the refrigeration cycle device 10 in the dual cooling mode, the refrigerant flows as indicated by the broken arrows and one dot chain arrows in FIG. 1, and the state of the refrigerant circulating in the cycle changes as follows.

That is, the high-pressure refrigerant discharged from the compressor 11 flows into the condenser 12. The refrigerant flowing into the condenser 12 radiates heat to the cooling water in the high-temperature cooling water circuit 20. As a result, the refrigerant is cooled and condensed in the condenser 12.

As illustrated in the broken arrows in FIG. 1, the refrigerant flowing out of the condenser 12 flows into the first expansion valve 13F, and is decompressed and expanded until the refrigerant becomes the low-pressure refrigerant at the first expansion valve 13F. The low-pressure refrigerant decompressed at the first expansion valve 13F flows into the front-seat side evaporator 14F, absorbs heat from the air blown into the vehicle interior, and evaporates. As a result, the air blown into the vehicle interior is cooled.

At the same time, as indicated by the one dot chain arrows in FIG. 1, the refrigerant flowing out of the condenser 12 flows into the second expansion valve 13R, and the low-pressure refrigerant decompressed by the second expansion valve 13R decompressed and expanded until the refrigerant becomes the low-pressure refrigerant by the second expansion valve 13R flows into the rear-seat side evaporator 14R, absorbs heat from the air blown into the vehicle interior rear-seat side space, and evaporates. As a result, the air blown into the vehicle interior rear-seat side space is cooled.

As indicated by the broken arrows and the one dot chain arrows in FIG. 1, the refrigerant flowing out of the front-seat side evaporator 14F and the refrigerant flowing out of the rear-seat side evaporator 14R flow toward the suction side of the compressor 11 and are compressed again by the compressor 11.

In the dual cooling mode, the control device 60 controls the rotation speed Nc of the compressor 11 so that the temperature of the evaporator among the front-seat side evaporator 14F and the rear-seat side evaporator 14R having the lower target evaporator temperature approaches the target evaporator temperature.

Specifically, in a case where the target front-seat side evaporator temperature TEOF is lower than a target rear-seat side evaporator temperature TEOR, the control device 60 controls the rotation speed Nc of the compressor 11 so that the front-seat side evaporator temperature TEF approaches the target front-seat side evaporator temperature TEOF. The target rear-seat side evaporator temperature TEOR is determined based on a rear-seat side target blowing temperature TAOR with reference to a control map stored in advance in the control device 60. Specifically, in a case where the target front-seat side evaporator temperature TEOF is lower than the target rear-seat side evaporator temperature TEOR, the control device 60 controls the rotation speed Nc of the compressor 11 so that the rear-seat side evaporator temperature TER approaches the target rear-seat side evaporator temperature TEOR.

In the high-temperature cooling water circuit 20 in the dual cooling mode, as indicated by the broken arrows in FIG. 1, the cooling water in the high-temperature cooling water circuit 20 circulates through the high-temperature side radiator 23, and the heat is radiated from the cooling water to the outside air by the high-temperature side radiator 23.

At this time, as indicated by the solid arrows in FIG. 1, the cooling water in the high-temperature cooling water circuit 20 also circulates in the front-seat side heater core 22F and the rear-seat side heater core 22R, but the amount of heat radiated from the cooling water to the air in the front-seat side heater core 22F is adjusted by the front-seat side air mix door 54F, and the amount of heat radiated from the cooling water to the air in the rear-seat side heater core 22R is adjusted by the rear-seat side air mix door 54R.

The control signal output to the servomotor of the front-seat side air mix door 54F is determined such that the temperature of the conditioned air whose temperature has been adjusted by the front-seat side air mix door 54F becomes the front-seat side target blowing temperature TAOF, similarly to the single cooling mode.

The control signal output to the servomotor of the rear-seat side air mix door 54R is determined such that the temperature of the conditioned air whose temperature has been adjusted by the rear-seat side air mix door 54R becomes the rear-seat side target blowing temperature TAOR. Specifically, the opening of the rear-seat side air mix door 54R is determined based on the rear-seat side target blowing temperature TAOR, the temperature TER of the rear-seat side evaporator 14R, the temperature THinR of the cooling water flowing into the rear-seat side heater core 22R, and the like.

The rear-seat side target blowing temperature TAOR is a target temperature of the blown air blown into the vehicle interior by the rear-seat side air conditioning unit 50R. The control device 60 calculates the rear-seat side target blowing temperature TAOR on the basis of the following mathematical formula.

$$TAOR = Kset \times TsetR - Kr \times TrR - Kam \times Tam - Ks \times Ts + C$$

In this formula, TsetR is the vehicle interior set temperature set by the rear-seat side temperature setting switch of the operation panel 70, TrR is the rear-seat side inside air temperature detected by the rear-seat side inside-air temperature sensor 61R, Tam is the outside air temperature detected by the outside air temperature sensor 62, and Ts is the solar radiation amount detected by the solar radiation amount sensor 63. Kset, Kr, Kam, and Ks are control gains, and C is a correction constant.

As described above, in the dual cooling mode, both the front-seat side air conditioning unit 50F and the rear-seat side air conditioning unit 50R can cool the vehicle interior.

(8) Dual First Dehumidifying and Heating Mode

In the dual first dehumidifying and heating mode, in contrast to the single first dehumidifying and heating mode, the second expansion valve 13R is brought into the throttling state in which the refrigerant decompression action is exerted, and the rear-seat side indoor blower 53R is operated.

In the dual first dehumidifying and heating mode, the control device 60 controls the rotation speed Nc of the compressor 11 similarly to the dual cooling mode.

As a result, in the refrigeration cycle device 10 in the dual first dehumidifying and heating mode, the refrigerant flows as indicated by the broken arrows and the one dot chain arrows in FIG. 1, and the state of the refrigerant circulating in the cycle changes as follows.

That is, the high-pressure refrigerant discharged from the compressor 11 flows into the condenser 12. The refrigerant flowing into the condenser 12 radiates heat to the cooling water in the high-temperature cooling water circuit 20. As a result, the refrigerant is cooled and condensed in the condenser 12.

As illustrated in the broken arrows in FIG. 1, the refrigerant flowing out of the condenser 12 flows into the first expansion valve 13F, and is decompressed and expanded until the refrigerant becomes the low-pressure refrigerant at the first expansion valve 13F. The low-pressure refrigerant decompressed at the first expansion valve 13F flows into the front-seat side evaporator 14F, absorbs heat from the air blown into the vehicle interior, and evaporates. As a result, the air blown into the vehicle interior is cooled.

At the same time, as indicated by the one dot chain arrows in FIG. 1, the refrigerant flowing out of the condenser 12 flows into the second expansion valve 13R, and the low-pressure refrigerant decompressed by the second expansion valve 13R decompressed and expanded until the refrigerant becomes the low-pressure refrigerant by the second expansion valve 13R flows into the rear-seat side evaporator 14R, absorbs heat from the air blown into the vehicle interior rear-seat side space, and evaporates. As a result, the air blown into the vehicle interior rear-seat side space is cooled.

As indicated by the broken arrows and the one dot chain arrows in FIG. 1, the refrigerant flowing out of the front-seat side evaporator 14F and the refrigerant flowing out of the rear-seat side evaporator 14R flow toward the suction side of the compressor 11 and are compressed again by the compressor 11.

In the high-temperature cooling water circuit 20 in the dual first dehumidifying and heating mode, as indicated by the broken arrows in FIG. 1, the cooling water in the high-temperature cooling water circuit 20 circulates through the high-temperature side radiator 23, and the heat is radiated from the cooling water to the outside air by the high-temperature side radiator 23.

At this time, as indicated by the solid arrows in FIG. 1, the cooling water in the high-temperature cooling water circuit 20 circulates also through the front-seat side heater core 22F and the rear-seat side heater core 22R.

In the dual first dehumidifying and heating mode, the control device 60 controls the three-way valve 26 so that the temperature of the cooling water flowing into the heater core among the front-seat side heater core 22F and the rear-seat side heater core 22R having the higher target heater core temperature becomes the target heater core temperature. Further, the control signal output to the servomotor of the air mix door corresponding to the heater core having the higher target heater core temperature is determined such that the air passage of the heater core is fully opened and the entire flow rate of the air having passed through the evaporator passes through the heater core. Meanwhile, the control signal output to the servomotor of the air mix door corresponding to the heater core having the lower target heater core temperature is determined such that the temperature of the conditioned air whose temperature has been adjusted by the air mix door becomes the target blowing temperature.

For example, in a case where the target front-seat side heater core temperature THOF is higher than the target rear-seat side heater core temperature THOR (that is, the target temperature of the cooling water flowing into the rear-seat side heater core 22R), the control device 60 controls the three-way valve 26, the front-seat side air mix door 54F, and the rear-seat side air mix door 54R as follows. The control device 60 controls the three-way valve 26 so that the temperature THinF of the cooling water flowing into the front-seat side heater core 22F becomes the target front-seat side heater core temperature THOF. The control device 60 performs the control so that the front-seat side air mix door 54F is located at the position indicated by the two-dot chain lines in FIG. 2 to fully open the air passage of the front-seat side heater core 22F, and the entire flow rate of the air having passed through the front-seat side evaporator 14F passes through the front-seat side heater core 22F. The control device controls the rear-seat side air mix door 54R so that the temperature of the conditioned air whose temperature has been adjusted by the rear-seat side air mix door 54R becomes the rear-seat side target blowing temperature TAOR. Specifically, the opening of the rear-seat side air mix door 54R is determined based on the rear-seat side target blowing temperature TAOR, the temperature TER of the rear-seat side evaporator 14R, the temperature THinR of the cooling water flowing into the rear-seat side heater core 22R, and the like. In this example, the target rear-seat side heater core temperature THOR is equal to the rear-seat side target blowing temperature TAOR.

For example, in a case where the target rear-seat side heater core temperature THOR is higher than the target front-seat side heater core temperature THOF, the control device 60 controls the three-way valve 26, the front-seat side air mix door 54F, and the rear-seat side air mix door 54R as follows. The control device 60 controls the three-way valve 26 so that the temperature of the cooling water flowing into the rear-seat side heater core 22R becomes the target rear-seat side heater core temperature THOR. The control device 60 performs the control so that the rear-seat side air mix door 54R is located at the position indicated by two-dot chain lines in FIG. 2 to fully open the air passage of the rear-seat side heater core 22R, and the entire flow rate of the air having passed through the rear-seat side evaporator 14R passes through the rear-seat side heater core 22R. The control device 60 controls the front-seat side air mix door 54F so that the temperature of the conditioned air whose temperature has been adjusted by the front-seat side air mix door 54F becomes the front-seat side target blowing temperature TAOF.

Preferably, the control device 60 controls the three-way valve 26 so that the flow rate of the cooling water is preferentially adjusted with respect to the front-seat side heater core 22F among the front-seat side heater core 22F and the rear-seat side heater core 22R. This is to ensure the anti-fog properties on the front-seat side as much as possible.

As described above, in the dual first dehumidifying and heating mode, both the front-seat side air conditioning unit 50F and the rear-seat side air conditioning unit can dehumidify and heat the vehicle interior.

(9) Dual Second Dehumidifying and Heating Mode

Because the dual second dehumidifying and heating mode is performed under the condition where at least one of the front-seat side target blowing temperature TAOF and the rear-seat side target blowing temperature TAOR is in a higher temperature region as compared to the dual first dehumidifying and heating mode, the blown air temperature in the front-seat side heater core 22F needs to be higher than in the dual first dehumidifying and heating mode.

In the dual second dehumidifying and heating mode, in contrast to the single second dehumidifying and heating mode, the second expansion valve 13R is brought into the throttling state in which the refrigerant decompression action is exerted, and the rear-seat side indoor blower 53R is operated.

In the dual second dehumidifying and heating mode, the control device 60 controls the rotation speed Nc of the compressor 11 similarly to the dual first dehumidifying and heating mode.

As a result, in the refrigeration cycle device 10 in the second dual dehumidifying and heating mode, the refrigerant flows as indicated by the broken arrows and the one dot chain arrows in FIG. 1 similarly to the dual first dehumidifying and heating mode, the air blown into the vehicle interior is cooled by the front-seat side evaporator 14F, and the air blown into the vehicle interior rear-seat side space is cooled by the rear-seat side evaporator 14R.

In the high-temperature cooling water circuit 20 in the dual second dehumidifying and heating mode, as indicated by the broken arrows in FIG. 1, the cooling water in the high-temperature cooling water circuit 20 circulates through the high-temperature side radiator 23, and the heat is radiated from the cooling water to the outside air by the high-temperature side radiator 23.

At this time, as indicated by the solid arrows in FIG. 1, the cooling water in the high-temperature cooling water circuit 20 circulates also through the front-seat side heater core 22F and the rear-seat side heater core 22R.

In the second dual dehumidifying and heating mode, the control device 60 controls the three-way valve 26, the front-seat side air mix door 54F, and the rear-seat side air mix door 54R similarly to the dual first dehumidifying and heating mode.

That is, in the dual second dehumidifying and heating mode, the control device 60 controls the three-way valve 26 so that the temperature of the cooling water flowing into the heater core among the front-seat side heater core 22F and the rear-seat side heater core 22R having the higher target heater core temperature becomes the target heater core temperature. Further, the control signal output to the servomotor of the air mix door corresponding to the heater core having the higher target heater core temperature is determined such that the air passage of the heater core is fully opened and the entire flow rate of the air having passed through the evaporator passes through the heater core. Meanwhile, the control signal output to the servomotor of the air mix door corresponding to the heater core having the lower target heater core temperature is determined such that the temperature of the conditioned air whose temperature has been adjusted by the air mix door becomes the target blowing temperature.

As described above, in the dual second dehumidifying and heating mode, both the front-seat side air conditioning unit 50F and the rear-seat side air conditioning unit 50R can dehumidify and heat the vehicle interior. In the dual second dehumidifying and heating mode, because the cooling water in the low-temperature cooling water circuit 30 absorbs heat from outside air at the low-temperature side radiator 32, as compared to the dual first dehumidifying and heating mode, the amount of heat available to the front-seat side heater core 22F and the rear-seat side heater core 22R can be increased and the blown air temperature of the front-seat side heater core 22F and the blown air temperature of the rear-seat side heater core 22R can be increased.

(10) Dual Third Dehumidifying and Heating Mode

Because the dual third dehumidifying and heating mode is performed under the condition where at least one of the front-seat side target blowing temperature TAOF and the rear-seat side target blowing temperature TAOR is in a higher temperature region as compared to the dual second dehumidifying and heating mode, the blown air temperature in the front-seat side heater core 22F needs to be higher than in the dual second dehumidifying and heating mode.

In the dual third dehumidifying and heating mode, in contrast to the single third dehumidifying and heating mode, the second expansion valve 13R is brought into the throttling state in which the refrigerant decompression action is exerted, and the rear-seat side indoor blower 53R is operated.

As a result, in the refrigeration cycle device 10 in the dual third dehumidifying and heating mode, the refrigerant flows as indicated by the broken arrows and the one dot chain arrows in FIG. 1 similarly to the dual second dehumidifying and heating mode, the air blown into the vehicle interior is cooled by the front-seat side evaporator 14F, and the air blown into the vehicle interior rear-seat side space is cooled by the rear-seat side evaporator 14R.

In the dual third dehumidifying and heating mode, the control device 60 controls the three-way valve 26 similarly to the single third dehumidifying and heating mode. That is, the control device 60 controls the three-way valve 26 so that the cooling water does not flow into the high-temperature side radiator 23.

Therefore, in the high-temperature cooling water circuit 20 in the dual third dehumidifying and heating mode, as indicated by the solid arrows in FIG. 1, the cooling water in the high-temperature cooling water circuit 20 circulates through the front-seat side heater core 22F and the rear-seat side heater core 22R.

In the dual third dehumidifying and heating mode, the control device 60 controls the compressor 11 so that the temperature of the cooling water flowing into the heater core among the front-seat side heater core 22F and the rear-seat side heater core 22R having the higher target heater core temperature becomes the target heater core temperature. Further, the control signal output to the servomotor of the air mix door corresponding to the heater core having the higher target heater core temperature is determined such that the air passage of the heater core is fully opened and the entire flow rate of the air having passed through the evaporator passes through the heater core. Meanwhile, the control signal output to the servomotor of the air mix door corresponding to the heater core having the lower target heater core temperature is determined such that the temperature of the conditioned air whose temperature has been adjusted by the air mix door becomes the target blowing temperature.

For example, in a case where the target front-seat side heater core temperature THOF is higher than the target rear-seat side heater core temperature THOR, the control device 60 controls the compressor 11, the front-seat side air mix door 54F, and the rear-seat side air mix door 54R as follows. The control device 60 controls the compressor 11 so that the temperature THinF of the cooling water flowing into the front-seat side heater core 22F becomes the target front-seat side heater core temperature THOF. The control device 60 performs the control so that the front-seat side air mix door 54F is located at the position indicated by the two-dot chain lines in FIG. 2 to fully open the air passage of the front-seat side heater core 22F, and the entire flow rate of the air having passed through the front-seat side evaporator 14F passes through the front-seat side heater core 22F. The control device 60 controls the rear-seat side air mix door 54R so that the temperature of the conditioned air whose temperature has been adjusted by the rear-seat side air mix door 54R becomes the rear-seat side target blowing temperature TAOR.

For example, in a case where the target rear-seat side heater core temperature THOR is higher than the target front-seat side heater core temperature THOF, the control device 60 controls the compressor 11, the front-seat side air mix door 54F, and the rear-seat side air mix door 54R as follows. The control device 60 controls the compressor 11 so that the temperature of the cooling water flowing into the rear-seat side heater core 22R becomes the target rear-seat side heater core temperature THOR. The control device 60 performs the control so that the rear-seat side air mix door 54R is located at the position indicated by two-dot chain lines in FIG. 2 to fully open the air passage of the rear-seat side heater core 22R, and the entire flow rate of the air having passed through the rear-seat side evaporator 14R passes through the rear-seat side heater core 22R. The control device 60 controls the front-seat side air mix door 54F so that the temperature of the conditioned air whose temperature has been adjusted by the front-seat side air mix door 54F becomes the front-seat side target blowing temperature TAOF.

As described above, in the dual third dehumidifying and heating mode, both the front-seat side air conditioning unit 50F and the rear-seat side air conditioning unit can dehumidify and heat the vehicle interior. In the dual third dehumidifying and heating mode, because the rotation speed Nc of the compressor 11 is set higher than the second dehumidifying and heating mode, as compared to the dual second dehumidifying and heating mode, the amount of heat available to the front-seat side heater core 22F and the rear-seat side heater core 22R can be increased and the blown air temperature of the front-seat side heater core 22F and the blown air temperature of the rear-seat side heater core 22R can be increased.

(11) Dual Fourth Dehumidifying and Heating Mode

Because the dual fourth dehumidifying and heating mode is performed under the condition where at least one of the front-seat side target blowing temperature TAOF and the rear-seat side target blowing temperature TAOR is in a higher temperature region as compared to the dual third dehumidifying and heating mode, the blown air temperature in the front-seat side heater core 22F needs to be higher than in the dual third dehumidifying and heating mode.

In the dual fourth dehumidifying and heating mode, in contrast to the single fourth dehumidifying and heating mode, the second expansion valve 13R is brought into the throttling state in which the refrigerant decompression action is exerted, and the rear-seat side indoor blower 53R is operated.

As a result, in the refrigeration cycle device 10 in the dual fourth dehumidifying and heating mode, the refrigerant flows as indicated by the broken arrows and the one dot chain arrows in FIG. 1 similarly to the dual third dehumidifying and heating mode, the air blown into the vehicle interior is cooled by the front-seat side evaporator 14F, and the air blown into the vehicle interior rear-seat side space is cooled by the rear-seat side evaporator 14R.

In the dual fourth dehumidifying and heating mode, the control device 60 controls the three-way valve 26 and the compressor 11 similarly to the single fourth dehumidifying and heating mode. That is, the control device 60 controls the three-way valve 26 so that the cooling water does not flow into the high-temperature side radiator 23, and sets the rotation speed Nc of the compressor 11 to the upper limit rotation speed.

Therefore, in the high-temperature cooling water circuit 20 in the dual fourth dehumidifying and heating mode, as indicated by the solid arrows in FIG. 1, the cooling water in the high-temperature cooling water circuit 20 circulates through the front-seat side heater core 22F and the rear-seat side heater core 22R.

In the dual fourth dehumidifying and heating mode, the control device 60 controls the electric heater 25 so that the temperature of the cooling water flowing into the heater core among the front-seat side heater core 22F and the rear-seat side heater core 22R having the higher target heater core temperature becomes the target heater core temperature. Further, the control signal output to the servomotor of the air mix door corresponding to the heater core having the higher target heater core temperature is determined such that the air passage of the heater core is fully opened and the entire flow rate of the air having passed through the evaporator passes through the heater core. Meanwhile, the control signal output to the servomotor of the air mix door corresponding to the heater core having the lower target heater core temperature is determined such that the temperature of the conditioned air whose temperature has been adjusted by the air mix door becomes the target blowing temperature.

For example, in a case where the target front-seat side heater core temperature THOF is higher than the target rear-seat side heater core temperature THOR, the control device 60 controls the electric heater 25, the front-seat side air mix door 54F, and the rear-seat side air mix door 54R as follows. The control device 60 controls the electric heater 25 so that the temperature THinF of the cooling water flowing into the front-seat side heater core 22F becomes the target front-seat side heater core temperature THOF. The control device 60 performs the control so that the front-seat side air mix door 54F is located at the position indicated by the two-dot chain lines in FIG. 2 to fully open the air passage of the front-seat side heater core 22F, and the entire flow rate of the air having passed through the front-seat side evaporator 14F passes through the front-seat side heater core 22F. The control device 60 controls the rear-seat side air mix door 54R so that the temperature of the conditioned air whose temperature has been adjusted by the rear-seat side air mix door 54R becomes the rear-seat side target blowing temperature TAOR.

For example, in a case where the target rear-seat side heater core temperature THOR is higher than the target front-seat side heater core temperature THOF, the control device 60 controls the electric heater 25, the front-seat side air mix door 54F, and the rear-seat side air mix door 54R as follows. The control device 60 controls the electric heater 25 so that the temperature THinR of the cooling water flowing into the rear-seat side heater core 22R becomes the target rear-seat side heater core temperature THOR. The control device 60 performs the control so that the rear-seat side air mix door 54R is located at the position indicated by two-dot chain lines in FIG. 2 to fully open the air passage of the rear-seat side heater core 22R, and the entire flow rate of the air having passed through the rear-seat side evaporator 14R passes through the rear-seat side heater core 22R. The control device 60 controls the front-seat side air mix door 54F so that the temperature of the conditioned air whose temperature has been adjusted by the front-seat side air mix door 54F becomes the front-seat side target blowing temperature TAOF.

As described above, in the dual fourth dehumidifying and heating mode, both the front-seat side air conditioning unit 50F and the rear-seat side air conditioning unit 50R can dehumidify and heat the vehicle interior. In the dual fourth dehumidifying and heating mode, because the electric heater 25 is operated, as compared to the dual third dehumidifying and heating mode, the amount of heat available to the front-seat side heater core 22F and the rear-seat side heater core 22R can be increased and the blown air temperature of the front-seat side heater core 22F and the blown air temperature of the rear-seat side heater core 22R can be increased.

(12) Dual Heating Mode

In the dual heating mode, similarly to the single heating mode, the control device 60 operates the compressor 11 and the high-temperature side pump 21, closes the first expansion valve 13F, closes the second expansion valve 13R, and brings the third expansion valve 13C into the throttling state in which the refrigerant decompression action is exerted.

As a result, in the refrigeration cycle device 10 in the dual heating mode, the refrigerant flows as indicated by the solid arrows in FIG. 1 similarly to the single heating mode, and the low-pressure refrigerant absorbs heat from the cooling water in the low-temperature cooling water circuit 30 at the cooling evaporator 14C, and the cooled cooling water in the low-temperature cooling water circuit 30 can flow into the low-temperature side radiator 32. As a result, heat can be absorbed from the outside air at the low-temperature side radiator 32.

In the dual heating mode, the control device 60 controls the three-way valve 26 similarly to the single heating mode. That is, the control device 60 controls the three-way valve 26 so that the cooling water does not flow into the high-temperature side radiator 23.

Therefore, in the high-temperature cooling water circuit 20 in the dual heating mode, as indicated by the solid arrows in FIG. 1, the cooling water in the high-temperature cooling water circuit 20 circulates through the front-seat side heater core 22F and the rear-seat side heater core 22R.

In the dual heating mode, because the rear-seat side indoor blower 53R is operated, heat is dissipated from the cooling water to the air in the rear-seat side heater core 22R.

In the dual heating mode, the control device 60 controls the compressor 11 and the electric heater 25 so that the temperature of the cooling water flowing into the heater core among the front-seat side heater core 22F and the rear-seat side heater core 22R having the higher target heater core temperature becomes the target heater core temperature. Further, the control signal output to the servomotor of the air mix door corresponding to the heater core having the higher target heater core temperature is determined such that the air passage of the heater core is fully opened and the entire flow rate of the air having passed through the evaporator passes through the heater core. Meanwhile, the control signal output to the servomotor of the air mix door corresponding to the heater core having the lower target heater core temperature is determined such that the temperature of the conditioned air whose temperature has been adjusted by the air mix door becomes the target blowing temperature.

For example, in a case where the target front-seat side heater core temperature THOF is higher than the target rear-seat side heater core temperature THOR, the control device 60 controls the compressor 11, the electric heater 25, the front-seat side air mix door 54F, and the rear-seat side air mix door 54R as follows. The control device 60 controls the compressor 11 and the electric heater 25 so that the temperature THinF of the cooling water flowing into the front-seat side heater core 22F becomes the target front-seat side heater core temperature THOF. The control device performs the control so that the front-seat side air mix door 54F is located at the position indicated by the two-dot chain lines in FIG. 2 to fully open the air passage of the front-seat side heater core 22F, and the entire flow rate of the air having passed through the front-seat side evaporator 14F passes through the front-seat side heater core 22F. The control device 60 controls the rear-seat side air mix door 54R so that the temperature of the conditioned air whose temperature has been adjusted by the rear-seat side air mix door 54R becomes the rear-seat side target blowing temperature TAOR.

For example, in a case where the target rear-seat side heater core temperature THOR is higher than the target front-seat side heater core temperature THOF, the control device 60 controls the compressor 11, the electric heater 25, the front-seat side air mix door 54F, and the rear-seat side air mix door 54R as follows. The control device 60 controls the compressor 11 and the electric heater 25 so that the temperature THinR of the cooling water flowing into the rear-seat side heater core 22R becomes the target rear-seat side heater core temperature THOR. The control device performs the control so that the rear-seat side air mix door 54R is located at the position indicated by two-dot chain lines in FIG. 2 to fully open the air passage of the rear-seat side heater core 22R, and the entire flow rate of the air having passed through the rear-seat side evaporator 14R passes through the rear-seat side heater core 22R. The control device 60 controls the front-seat side air mix door 54F so that the temperature of the conditioned air whose temperature has been adjusted by the front-seat side air mix door 54F becomes the front-seat side target blowing temperature TAO F.

As described above, in the dual heating mode, both the front-seat side air conditioning unit 50F and the rear-seat side air conditioning unit 50R can heat the vehicle interior.

In the present embodiment, the radiator side flow rate adjusting unit 26a and the heater core side flow rate adjusting unit 26b of the three-way valve 26 are disposed in the first branch part 20a of the high-temperature cooling water circuit 20, and the flow rate of the cooling water can be optionally adjusted. The control device 60 controls the radiator side flow rate adjusting unit 26a and the heater core side flow rate adjusting unit 26b of the three-way valve 26.

With this configuration, the flow rate of the cooling water can be appropriately adjusted with respect to the front-seat side heater core 22F, the rear-seat side heater core 22R, and the radiator 23.

In the present embodiment, because the radiator side flow rate adjusting unit 26a and the heater core side flow rate adjusting unit 26b constitute the three-way valve 26, the configuration can be simplified as compared with the case where the radiator side flow rate adjusting unit 26a and the heater core side flow rate adjusting unit 26b are separate flow rate adjusting valves.

In the present embodiment, the front-seat side heater core temperature sensor 66F detects the temperature THinF of the cooling water flowing into the front-seat side heater core 22F, and the rear-seat side heater core temperature sensor 66R detects the temperature THinR of the cooling water flowing into the rear-seat side heater core 22R. With this configuration, the temperature of the front-seat side heater core 22F and the temperature of the rear-seat side heater core 22R can be appropriately grasped.

In the single first dehumidifying and heating mode and the single second dehumidifying and heating mode of the present embodiment, the control device 60 controls the three-way valve 26 so that the radiator side flow rate ratio Rr decreases as the target temperature THOF of the front-seat side heater core 22F increases. With this configuration, the temperature of the front-seat side heater core 22F can be appropriately controlled.

In the dual first dehumidifying and heating mode and the dual second dehumidifying and heating mode of the present embodiment, the control device 60 controls the three-way valve 26 so that the temperature of the heater core among the front-seat side heater core 22F and the rear-seat side heater core 22R having the higher target heater core temperature becomes the target heater core temperature, and controls the front-seat side air mix door 54F and the rear-seat side air mix door 54R so that the blown air temperature of the heater core having the lower target heater core temperature becomes the target blowing temperature.

With this configuration, the blown air temperature can be appropriately adjusted by both the front-seat side heater core 22F and the rear-seat side heater core 22R.

In the dual third dehumidifying and heating mode of the present embodiment, the control device 60 controls the compressor 11 so that the temperature of the cooling water flowing into the heater core among the front-seat side heater core 22F and the rear-seat side heater core 22R having the higher target heater core temperature becomes the target heater core temperature.

With this configuration, when the amount of heat exchange at the heater core having the higher target heater core temperature is insufficient even if the three-way valve 26 is controlled in the dual second dehumidifying and heating mode, the mode is switched to the dual third dehumidifying and heating mode to allow the blown air temperature to be appropriately adjusted by both the front-seat side heater core 22F and the rear-seat side heater core 22R.

In the single first dehumidifying and heating mode and the single second dehumidifying and heating mode of the present embodiment, the control device 60 preferably controls the three-way valve 26 so that: the magnitude relationship of the heat medium flow rate in each of the front-seat side heater core 22F, the rear-seat side heater core 22R, and the high-temperature side radiator 23 becomes the front-seat side heater core 22F>the rear-seat side heater core 22R>the high-temperature side radiator 23; and the sum of the product of the heat medium flow rate and the heat exchange area in the front-seat side heater core 22F and the product of the heat medium flow rate and the heat exchange area in the rear-seat side heater core 22R becomes equal to the product of the heat medium flow rate and the heat exchange area in the high-temperature side radiator 23.

In the present embodiment, the electric heater 25 heats the cooling water in the cooling water flow path between the radiator side branch part 20a and the heater core side branch part 20c in the high-temperature cooling water circuit 20. With this configuration, the electric heater 25 can efficiently increase the temperature of the heat medium flowing into the front-seat side heater core 22F and the rear-seat side heater core 22R.

In the present embodiment, the flow rate adjusting orifice 27 is disposed in the heater core side branch part 20c of the high-temperature cooling water circuit 20. With this configuration, the cooling water flow rate ratio between the front-seat side heater core 22F and the rear-seat side heater core 22R can be adjusted with a simple configuration.

Second Embodiment

In the present embodiment, a radiator side flow rate adjusting valve 28 and the heater core side flow rate adjusting valve 29 are disposed in a high-temperature cooling water circuit 20 instead of the three-way valve 26 of the first embodiment.

Figure 4:
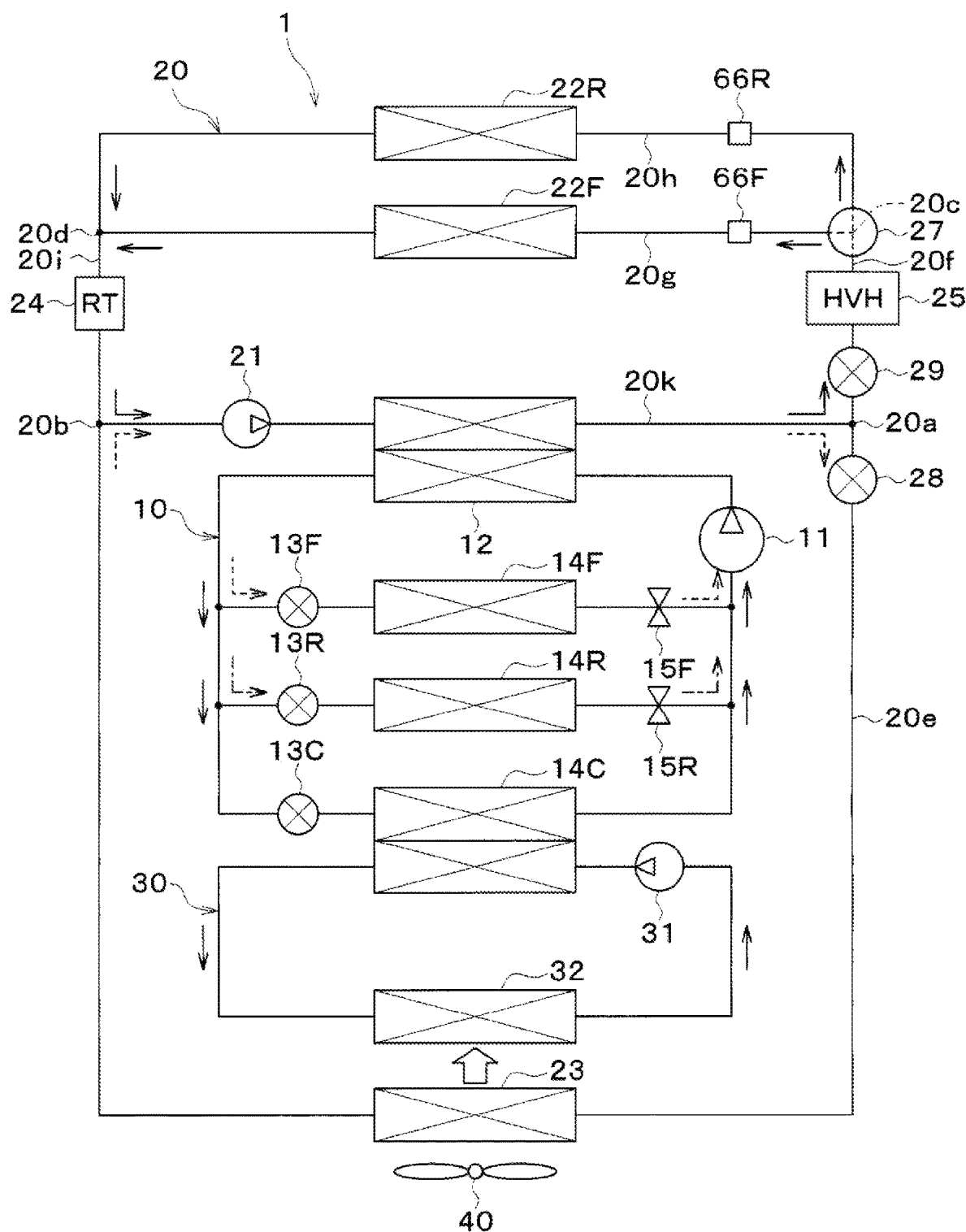
FIG. 4 is an overall configuration diagram illustrating an air conditioner of a second embodiment.

As illustrated in FIG. 4, the radiator side flow rate adjusting valve 28 is disposed between a radiator side branch part 20a and a high-temperature side radiator 23 in the high-temperature cooling water circuit 20. The heater core side flow rate adjusting valve 29 is disposed between the radiator side branch part 20a and a heater core side branch part 20c in the high-temperature cooling water circuit 20.

The radiator side flow rate adjusting valve 28 and the heater core side flow rate adjusting valve 29 are electromagnetic flow rate adjusting valves that adjust the opening of the cooling water flow path. The operation of the radiator side flow rate adjusting valve 28 and the heater core side flow rate adjusting valve 29 is controlled by the control device 60. The radiator side flow rate adjusting valve 28 is a first flow rate adjusting unit. The heater core side flow rate adjusting valve 29 is a second flow rate adjusting unit.

The radiator side flow rate adjusting valve 28 and the heater core side flow rate adjusting valve 29 optionally adjusts a flow rate ratio between the cooling water in the high-temperature cooling water circuit 20 flowing into the side of the high-temperature side radiator 23 and the cooling water in the high-temperature cooling water circuit 20 flowing into the side of heater cores 22F and 22R.

Although not illustrated, the radiator side flow rate adjusting valve 28 may be disposed between the high-temperature side radiator 23 and a radiator side merging part 20b in the high-temperature cooling water circuit 20.

Although not illustrated, the heater core side flow rate adjusting valve 29 may be disposed between a heater core side merging part 20d and the radiator side merging part 20b in the high-temperature cooling water circuit 20.

Also in the present embodiment, the same effects as those of the first embodiment can be obtained.

Third Embodiment

In the first embodiment, the electric heater 25 is disposed between the radiator side branch part 20a and the heater core side branch part 20c in the high-temperature cooling water circuit 20. In the present embodiment, another arrangement example of an electric heater 25 is described.

Figure 5:
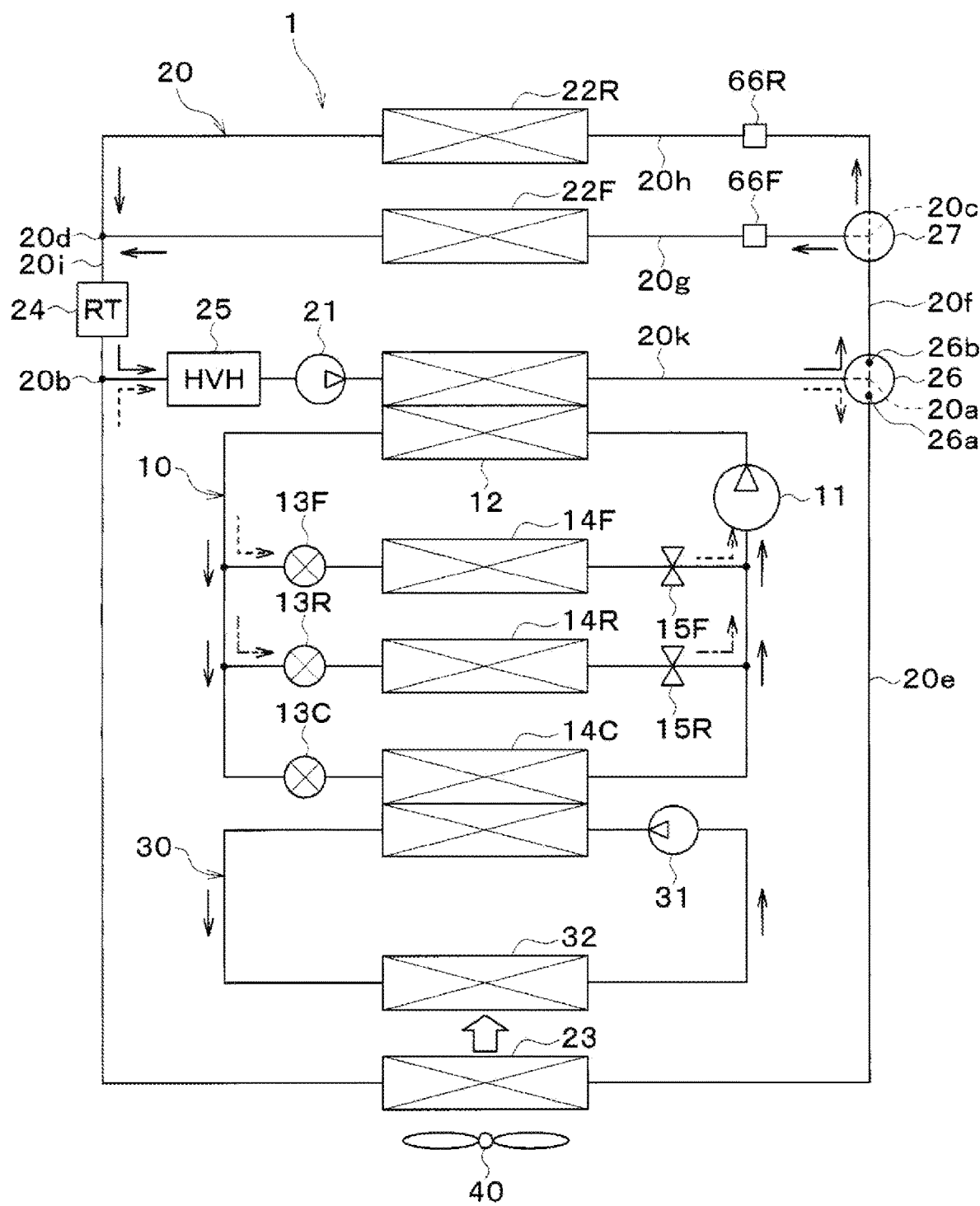
FIG. 5 is an overall configuration diagram illustrating an air conditioner in a first example of a third embodiment.

As illustrated in FIG. 5, the electric heater 25 may be disposed between a radiator side merging part 20b and a high-temperature side pump 21 in a high-temperature cooling water circuit 20.

Figure 6:
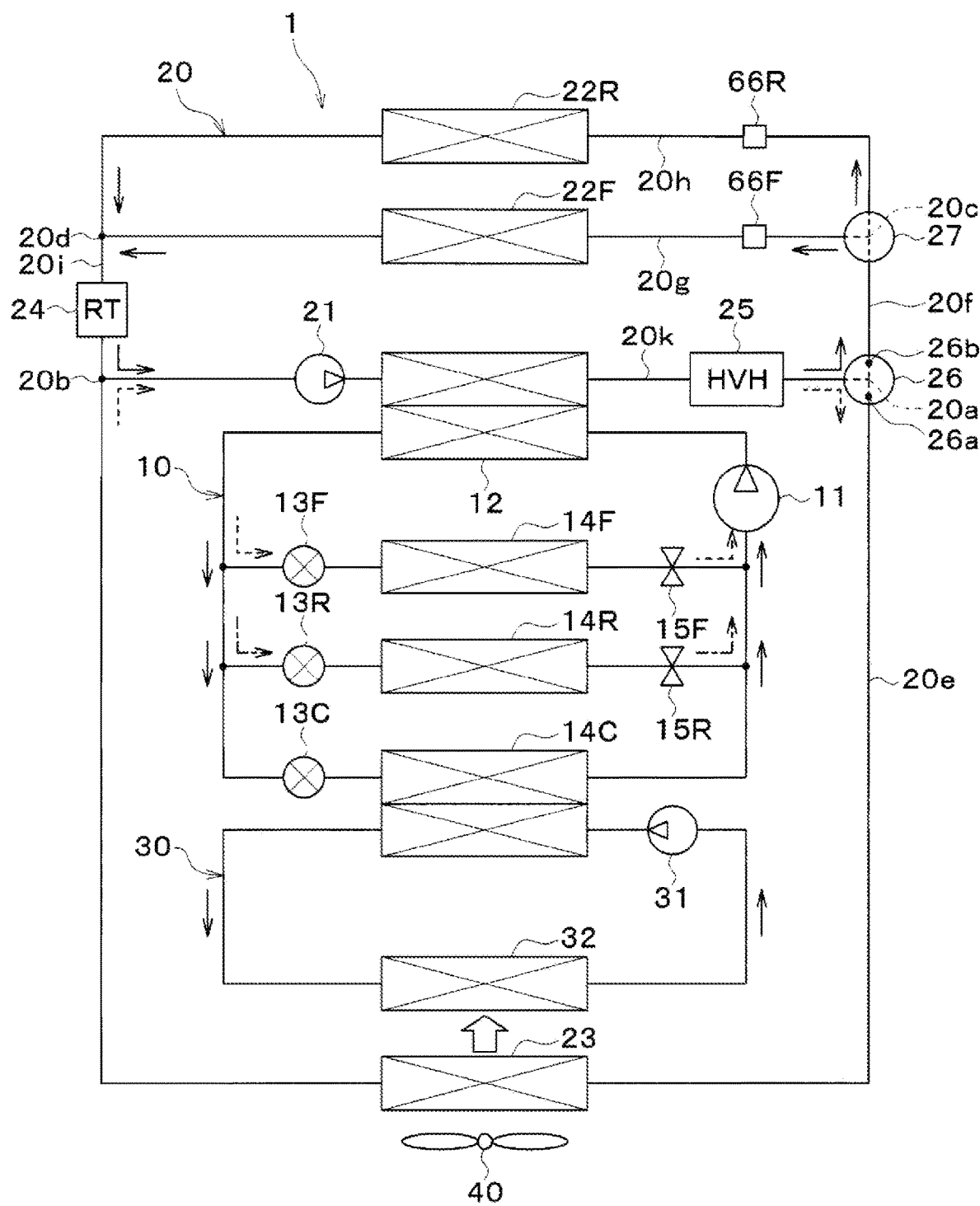
FIG. 6 is an overall configuration diagram illustrating the air conditioner in a second example of the third embodiment.

As illustrated in FIG. 6, the electric heater 25 may be disposed between a condenser 12 and a radiator side branch part 20a in the high-temperature cooling water circuit 20.

Also in the present embodiment, the same effects as those of the first embodiment can be obtained.

The present disclosure is not limited to the above-described embodiments, and can be variously modified as follows without departing from the gist of the present disclosure.

In the above embodiments, the cooling water is used as the heat medium, but various media such as oil may be used as the heat medium. As the heat medium, a nanofluid may be used. The nanofluid is a fluid in which nanoparticles having a particle size on the order of nanometers are mixed.

In the refrigeration cycle device 10 according to the above embodiments, a fluorocarbon refrigerant is used as the refrigerant. However, the refrigerant is not limited to the fluorocarbon refrigerant, and may be a natural refrigerant such as carbon dioxide or a hydrocarbon refrigerant.

The refrigeration cycle device 10 according to the above embodiments constitutes a subcritical refrigeration cycle in which the high-pressure side refrigerant pressure does not exceed the critical pressure of the refrigerant, but may constitute a supercritical refrigeration cycle in which the high-pressure side refrigerant pressure exceeds the critical pressure of the refrigerant.

The high-temperature side radiator 23 and the low-temperature side radiator 32 may be joined to each other by a common fin.

The common fin is a heat exchange promoting member that promotes heat exchange between the cooling water and the air. The common fin is a metal-made (such as aluminum-made) member.

The common fin is a coupling unit that transfers heat from the high-temperature side radiator 23 to the low-temperature side radiator 32 by coupling the high-temperature side radiator 23 and the low-temperature side radiator 32 with metal.

Accordingly, defrosting after the second to fourth dehumidifying and heating modes can be performed. In the second to fourth dehumidifying and heating modes, because the cooling water in the low-temperature cooling water circuit 30 absorbs heat from the outside air in the low-temperature side radiator 32, frosting occurs in the low-temperature side radiator 32 when the temperature of the low-temperature side radiator 32 becomes below the freezing point. Therefore, when the vehicle is stopped after the second to fourth dehumidifying and heating modes are executed, the heat remaining in the cooling water of the high-temperature cooling water circuit 20 can be used to defrost the low-temperature side radiator 32.

That is, because the high-temperature side radiator 23 and the low-temperature side radiator 32 are connected to each other by the common fin so as to allow the heat transfer, the heat of the cooling water in the high-temperature cooling water circuit 20 moves from the high-temperature side radiator 23 to the low-temperature side radiator 32.

As a result, the temperature of the low-temperature side radiator 32 rises, and the frost adhering to the surface of the low-temperature side radiator 32 can be melted.

The high-temperature side radiator 23 and the low-temperature side radiator 32 may be constituted of a single radiator.

For example, by integrating the cooling water tank of the high-temperature side radiator 23 and the cooling water tank of the low-temperature side radiator 32 with each other, the high-temperature side radiator 23 and the low-temperature side radiator 32 may be constituted of a single radiator.

The high-temperature side radiator 23 and the low-temperature side radiator 32 may be a single common radiator, and the cooling water of the high-temperature cooling water circuit 20 and the cooling water of the low-temperature cooling water circuit 30 may be switchably introduced into the single common radiator. The cooling water in the high-temperature cooling water circuit 20 and the cooling water in the low-temperature cooling water circuit 30 may be introduced into the single common radiator at an optional flow rate ratio.

An on-off valve or a flow rate adjusting valve of the cooling water flow path can be used to switch the cooling water to be introduced and to adjust the flow rate ratio.

The three-way valve 26 of the first embodiment and the radiator side flow rate adjusting valve 28 of the second embodiment are electromagnetic valves that can optionally adjust the opening of the cooling water flow path. Alternatively, the three-way valve 26 and the radiator side flow rate adjusting valve 28 of the second embodiment may be electromagnetic valves that simply open and close the cooling water flow path. In this case, by intermittently opening and closing the cooling water flow path using the radiator side flow rate adjusting valve 28 and by optionally adjusting the time average opening, the flow rate of the heat medium can be optionally adjusted by the radiator side flow rate adjusting valve 28.

In the dual first dehumidifying and heating mode and the dual second dehumidifying and heating mode, the control device 60 may control the three-way valve 26, the front-seat side air mix door 54F, and the rear-seat side air mix door 54R as follows.

In the dual first dehumidifying and heating mode, the control device 60 controls the three-way valve 26 so that the temperature of the heater core among the front-seat side heater core 22F and the rear-seat side heater core 22R having the larger sum of the target heater core temperature and the amount of decrease in water temperature due to heat loss in the high-temperature cooling water circuit 20 becomes the target heater core temperature. Further, regarding the control signal output to the servomotor of the air mix door corresponding to the heater core having the larger sum of the target heater core temperature and the amount of decrease in water temperature due to heat loss in the high-temperature cooling water circuit 20, the control signal is determined such that the air passage of the heater core is fully opened and the entire flow rate of the air having passed through the evaporator passes through the heater core. Meanwhile, regarding the control signal output to the servomotor of the air mix door corresponding to the heater core having the smaller sum of the target heater core temperature and the amount of decrease in water temperature due to heat loss in the high-temperature cooling water circuit 20, the control signal is determined such that the temperature of the conditioned air whose temperature has been adjusted by the air mix door becomes the target blowing temperature.

The amount of decrease in water temperature due to heat loss in the high-temperature cooling water circuit 20 of the rear-seat side heater core 22R is larger than the amount of decrease in water temperature due to heat loss in the high-temperature cooling water circuit 20 of the front-seat side heater core 22F. This is because the cooling water flow path length from the condenser 12 to the rear-seat side heater core 22R is longer than the cooling water flow path length from the condenser 12 to the front-seat side heater core 22F.

Therefore, the blown air temperature can be appropriately adjusted in both the front-seat side heater core 22F and the rear-seat side heater core 22R by taking into account the difference in heat loss between the front-seat side heater core 22F and the rear-seat side heater core 22R.

In the dual first dehumidifying and heating mode and the dual second dehumidifying and heating mode, the control device 60 may control the three-way valve 26, the front-seat side air mix door 54F, and the rear-seat side air mix door 54R as follows.

In the dual first dehumidifying and heating mode, the control device 60 controls the three-way valve 26 so that the temperature of the heater core among the front-seat side heater core 22F and the rear-seat side heater core 22R having the larger difference between the target heater core temperature and the current cooling water temperature becomes the target heater core temperature. Further, regarding the control signal output to the servomotor of the air mix door corresponding to the heater core having the larger difference between the target heater core temperature and the current cooling water temperature, the control signal is determined such that the air passage of the heater core is fully opened and the entire flow rate of the air having passed through the evaporator passes through the heater core. Meanwhile, regarding the control signal output to the servomotor of the air mix door corresponding to the heater core having the smaller difference between the target heater core temperature and the current cooling water temperature, the control signal is determined such that the temperature of the conditioned air whose temperature has been adjusted by the air mix door becomes the target blowing temperature.

In the first embodiment, the three-way valve 26 that is an electromagnetic three-way valve is disposed in the radiator side branch part 20a, and the flow rate adjusting orifice 27 that is a fixed throttle (in other words, the pressure loss body) is disposed in the heater core side branch part 20c. However, the arrangement of the electromagnetic three-way valve and the fixed throttle may be reversed.

That is, a fixed throttle may be disposed in the radiator side branch part 20a, and an electromagnetic three-way valve may be disposed in the heater core side branch part 20c.

According to the above embodiments, in the single cooling mode, the single first to fourth dehumidifying and heating modes, and the single heating mode, the air conditioning is performed by the front-seat side air conditioning unit 50F, and the air conditioning in the rear-seat side air conditioning unit 50R is stopped. However, the operation mode may be switchable to an operation mode in which the air conditioning is performed by the rear-seat side air conditioning unit 50R, and the air conditioning in the front-seat side air conditioning unit 50F is stopped. In this case, the air conditioning control in the rear-seat side air conditioning unit 50R may be performed on the rear-seat side air conditioning unit 50R in the same manner as the control of the front-seat side air conditioning unit 50F in the single cooling mode, the single first to fourth dehumidifying and heating modes, and the single heating mode.

Although the present disclosure has been described in accordance with the examples, it is understood that the present disclosure is not limited to the examples and structures. The present disclosure also includes various modifications and modifications within an equivalent range. In addition, various combinations and modes, and other combinations and modes including only one element, more elements, or less elements are also within the scope and idea of the present disclosure.

What is claimed is:

1. An air conditioner comprising:
a compressor configured to suck, compress, and discharge a refrigerant;
a heat-radiation heat exchanger configured to radiate heat to a heat medium from the refrigerant that is discharged from the compressor;
a decompression unit configured to decompress the refrigerant having radiated heat at the heat-radiation heat exchanger;
an evaporator configured to cause the refrigerant decompressed at the decompression unit to absorb heat and to be evaporated;
a heat medium circuit in which the heat medium having radiated heat at the heat radiation heat exchanger circulates;
a first heater core and a second heater core that are disposed in the heat medium circuit to perform heat exchange between the heat medium and air blown into a space to be air conditioned;
an outside-air heat exchanger that is disposed in the heat medium circuit to perform heat exchange between outside air and the heat medium;
a controller configured to control the heat medium circuit that includes: a first branch part where a flow of the heat medium branches into a first stream flowing toward the first heater core and a second stream flowing toward the outside-air heat exchanger; a first merging part where the heat medium from the first heater core merges with the heat medium flowing from the outside-air heat exchanger; a second branch part where the heat medium of the first stream between the first branch part and the first heater core branches to flow into the second heater core; and a second merging part where the heat medium flowing from the second heater core merges with the heat medium from the first heater core at a portion between the first heater core and the first merging part;

a first flow rate adjusting unit disposed in the heat medium circuit between the first branch part and the outside-air heat exchanger or between the outside-air heat exchanger and the first merging part, to adjust a flow rate of the heat medium; and a second flow rate adjusting unit disposed in the heat medium circuit between the first branch part and the first heater core or between the first heater core and the first merging part, to adjust a flow rate of the heat medium, wherein at least one of the first flow rate adjusting unit or the second flow rate adjusting unit is configured to optionally adjust the flow rate of the heat medium, and the controller is configured to control the at least one of the first flow rate adjusting unit or the second flow rate adjusting unit.

2. The air conditioner according to claim 1, wherein the at least one of the first flow rate adjusting unit or the second flow rate adjusting unit is made of a three-way valve that is disposed at the first branch part or the first merging part.

3. The air conditioner according to claim 1, further comprising
a first temperature detector configured to detect a temperature of the heat medium flowing into the first heater core; and
a second temperature detector configured to detect the temperature of the heat medium flowing into the second heater core.

4. The air conditioner according to claim 1, wherein the controller is configured to control the at least one of the first flow rate adjusting unit or the second flow rate adjusting unit, and to decrease a flow rate ratio of the heat medium flowing toward the outside-air heat exchanger when a target temperature of at least one of the first heater core or the second heater core increases.

5. The air conditioner according to claim 1, further comprising:
a first air mix door configured to adjust an air temperature blown into the space to be air conditioned by adjusting an air volume ratio between an air flow flowing through the first heater core and an air flow bypassing the first heater core; and
a second air mix door configured to adjust the air temperature blown into the space to be air conditioned by adjusting an air volume ratio between an air flow flowing through the second heater core and an air flow bypassing the second heater core, wherein
the controller is configured to:
control the at least one of the first flow rate adjusting unit or the second flow rate adjusting unit, to cause a temperature of one of the first heater core or the second heater core, having a higher value of a target temperature, to become the target temperature; and
control the first air mix door and the second air mix door, to cause the air temperature flowing out of the first heater core or the second heater core, having a lower value of the target temperature, to become a target air temperature.

6. The air conditioner according to claim 1, further comprising:
a first air mix door configured to adjust an air volume ratio between air flowing through the first heater core and air bypassing the first heater core; and
a second air mix door configured to adjust an air volume ratio between air flowing through the second heater core and air bypassing the second heater core, wherein
the controller is configured to:
control the at least one of the first flow rate adjusting unit or the second flow rate adjusting unit, to cause a temperature of one of the first heater core or the second heater core, having a larger value of a sum of a target temperature and an amount of decrease in a heat medium temperature due to heat loss in the heat medium circuit, to become the target temperature, and
control the first air mix door and the second air mix door to cause an air temperature flowing out of the other one of the first heater core or the second heater core, having a smaller value of the sum, to become a target air temperature.

7. The air conditioner according to claim 1, further comprising:
a first air mix door configured to adjust an air volume ratio between air flowing through the first heater core and the air bypassing the first heater core; and
a second air mix door configured to adjust an air volume ratio between air flowing through the second heater core and air bypassing the second heater core, wherein
the controller is configured to:
control the at least one of the first flow rate adjusting unit or the second flow rate adjusting unit, to cause a temperature of one of the first heater core or the second heater core, having a larger value of a difference between a target temperature and a current heat medium temperature, to become the target temperature, and
control the first air mix door and the second air mix door, to cause an air temperature flowing out of one of the first heater core or the second heater core, having a smaller value of the difference between the target temperature and the current heat medium temperature, to become the target temperature.

8. The air conditioner according to claim 1, further comprising:
a first air mix door configured to adjust an air temperature blown into the space to be air conditioned by adjusting an air volume ratio between air flowing through the first heater core and air bypassing the first heater core; and
a second air mix door configured to adjust the air temperature blown into the space to be air conditioned by adjusting an air volume ratio between air flowing through the second heater core and air bypassing the second heater core, wherein
in a case where only one of the first heater core or the second heater core performs a heat exchange, the controller is configured to control the at least one of the first flow rate adjusting unit or the second flow rate adjusting unit, to decrease the flow rate ratio of the heat medium flowing toward the radiator when a target temperature of the one of the first heater core or the second heater core increases;
in a case where both of the first heater core and the second heater core perform heat exchange, the controller is configured (i) to control the at least one of the first flow rate adjusting unit or the second flow rate adjusting unit, to cause a temperature of one of the first heater core or the second heater core, having a higher value of a target temperature, to become the target temperature, and (ii) to control the first air mix door and the second air mix door to cause an air temperature flowing out of one of the first heater core or second heater core, having a lower value of the target temperature, to become a target air temperature, and the controller is configured to control the compressor to cause the temperature of the one of the first heater core or the second heater core, having the higher value of the target temperature, to become the target temperature, in a case where a heat exchange amount is insufficient in the one of the first heater core or the second heater core, having the higher value of the target temperature, even when the at least one of the first flow rate adjusting unit or the second flow rate adjusting unit is controlled.

9. The air conditioner according to claim 1, wherein the controller is configured to control the at least one of the first flow rate adjusting unit or the second flow rate adjusting unit, (i) to have a magnitude relationship among heat medium flow rates in this order of the first heater core>the second heater core>the outside air heat exchanger; and (ii) to cause a sum of a product of the heat medium flow rate and a heat exchange area in the first heater core and a product of the heat medium flow rate and the heat exchange area in the second heater core to become equal to a product of the heat medium flow rate and the heat exchange area in the outside-air heat exchanger.

10. The air conditioner according to claim 1, further comprising
an electric heater configured to heat the heat medium in a heat medium flow path flowing from the second merging part to the second branch part via the heat radiation heat exchanger in the heat medium circuit.

11. The air conditioner according to claim 10, wherein the electric heater is disposed between the heat radiation heat exchanger and the second branch part in the heat medium circuit.

12. The air conditioner according to claim 10, wherein the electric heater is disposed between the first branch part and the second branch part in the heat medium circuit.

13. The air conditioner according to claim 1, wherein the heat medium circuit is provided with a pressure loss body that is configured to cause a pressure loss in the heat medium, the pressure loss body being disposed between the first branch part and the first heater core or the second heater core.

14. An air conditioner comprising:
a compressor configured to suck, compress, and discharge a refrigerant;
a first heat exchanger configured to perform a heat exchange between a heat medium circulating in a heat medium circuit and the refrigerant discharged from the compressor, to heat the heat medium;
a decompression unit configured to decompress the refrigerant flowing from the first heat exchanger;
an evaporator configured to cause the refrigerant decompressed at the decompression unit to absorb heat and to be evaporated;
a first heater core and a second heater core that are disposed in the heat medium circuit to perform heat exchange between the heat medium and air blown into a space to be air conditioned;
a second heat exchanger disposed in the heat medium circuit to perform heat exchange between outside air and the heat medium;
a first branch part provided in the heat medium circuit to branch a flow of the heat medium into a first stream flowing toward the first heater core and a second stream flowing toward the second heat exchanger;
a first merging part provided in the heat medium circuit to merge the heat medium from the first heater core with the heat medium flowing from the second heat exchanger;
a second branch part provided between the first branch part and the first heater core in the heat medium circuit, to branch a flow of the heat medium of the first stream to the second heater core;
a second merging part provided in the heat medium circuit to merge the heat medium flowing from the second heater core with the heat medium flowing from the first heater core at a portion between the first heater core and the first merging part;
a first flow rate valve disposed in the heat medium circuit between the first branch part and the second heat exchanger or between the second heat exchanger and the first merging part, to adjust a flow rate of the heat medium;
a second flow rate valve disposed in the heat medium circuit between the first branch part and the first heater core or between the first heater core and the first merging part, to adjust a flow rate of the heat medium; and
a controller configured to control at least one of the first flow rate valve or the second flow rate valve, to decrease a flow rate ratio of the heat medium flowing toward the second heat exchanger when a target temperature of at least one of the first heater core or the second heater core increases.

\* \* \* \* \*